United States Patent
Pinnamaneni et al.

(10) Patent No.: US 12,417,447 B2
(45) Date of Patent: Sep. 16, 2025

(54) MACHINE LEARNING FOR AUTHENTICATION BASED ON DEVICE PROXIMITY

(71) Applicant: MASTERCARD INTERNATIONAL INCORPORATED, Purchase, NY (US)

(72) Inventors: Venkata Satya Sivajee Pinnamaneni, Dardenne Prairie, MO (US); Kaushal Shetty, Thane (W) Maharashtra (IN); Sachin Kumar Singh, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 552 days.

(21) Appl. No.: 17/872,929

(22) Filed: Jul. 25, 2022

(65) Prior Publication Data
US 2024/0029052 A1    Jan. 25, 2024

(51) Int. Cl.
*G06Q 20/32* (2012.01)
*G06N 20/00* (2019.01)
*H04B 17/318* (2015.01)

(52) U.S. Cl.
CPC ......... *G06Q 20/3278* (2013.01); *G06N 20/00* (2019.01); *G06Q 20/321* (2020.05); *H04B 17/318* (2015.01)

(58) Field of Classification Search
CPC ........... G06Q 20/3278; G06Q 20/3226; G06Q 20/341; G06Q 20/204; G06Q 20/3227; G06Q 20/20; G06Q 20/32; G06Q 20/321; G06Q 20/3224; G06Q 20/34; G06Q 20/352; G06Q 20/353

USPC ....................................................... 455/41.2
See application file for complete search history.

(56) References Cited

U.S. PATENT DOCUMENTS

| | | |
|---|---|---|
| 9,830,589 B2 | 11/2017 | Xing |
| 10,393,394 B2 | 8/2019 | Anandhakrishnan |
| 10,546,302 B2 | 1/2020 | Zovi et al. |
| 10,846,493 B1 | 11/2020 | Edwards et al. |
| 10,984,406 B2 | 4/2021 | Laracey |
| 11,017,375 B2 | 5/2021 | Deshpande |

(Continued)

FOREIGN PATENT DOCUMENTS

KR     20100025623 A     10/2010

*Primary Examiner* — Ajibola A Akinyemi
(74) *Attorney, Agent, or Firm* — Barta Jones, PLLC

(57) ABSTRACT

A device and method of authentication includes pairing a card to a mobile electronic device and a wearable device. A machine learning model is trained by obtaining first received signal strength indicator (RSSI) data from the card, the mobile electronic device, and the wearable device at calibrated distances. A first estimated proximity radius encompassing the card, the mobile electronic device, and the wearable device is calculated. The first estimated proximity radius is classified to be within a threshold. Upon receipt of a request to authorize a request, second RSSI data from the card, the mobile electronic device, and the wearable device is obtained. A second estimated proximity radius encompassing the card, the mobile electronic device, and the wearable device is calculated. Using the trained machine learning model, the second estimated proximity radius is determined to be within the threshold. Authentication is then complete.

20 Claims, 12 Drawing Sheets

(56) References Cited

U.S. PATENT DOCUMENTS

| | | | |
|---|---|---|---|
| 2013/0243266 A1* | 9/2013 | Lazzouni | G06Q 50/265 |
| | | | 382/115 |
| 2018/0178759 A1* | 6/2018 | Santavicca | B60R 25/25 |

* cited by examiner

MACHINE LEARNING FOR AUTHENTICATION BASED ON DEVICE PROXIMITY

BACKGROUND

Transactions at a merchant point of sale (POS) terminal have traditionally been performed by a user swiping or inserting a credit or debit card into the POS terminal, and then manually authorizing the transaction by inputting a personal identification number (PIN) or a signature. The POS terminal uses the input PIN or signature to authenticate the user to authorize the transaction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various implementations of the present disclosure described herein are directed to systems and methods for authentication. A computerized method for authorizing a transaction includes pairing a payment card to a mobile electronic device and a wearable device, the payment card including at least one of near-field communication (NFC) or radio frequency identification (RFID) capability; training a machine learning model by obtaining first received signal strength indicator (RSSI) data from the payment card, the mobile electronic device, and the wearable device at calibrated distances, calculating a first estimated proximity radius encompassing the payment card, the mobile electronic device, and the wearable device, based on the first RSSI data, classifying the first estimated proximity radius to be within a threshold; receiving, from a chip reader, a request to authorize a transaction; obtaining second RSSI data from the payment card, the mobile electronic device, and the wearable device; calculating a second estimated proximity radius encompassing the payment card, the mobile electronic device, and the wearable device based on the second RSSI data; using the trained machine learning model, determining that the second estimated proximity radius is within the threshold; and authorizing, to the chip reader, the transaction.

In another implementation, a system for authorization includes at least one processor, at least one communications interface, and a memory. The memory stores instructions that, when executed by the at least one processor, cause the at least one processor to pair a payment card to a mobile electronic device and a wearable device, the payment card including at least one of NFC or RFID capability; train a machine learning model by obtaining first received signal strength indicator (RSSI) data from the payment card, the mobile electronic device, and the wearable device at calibrated distances, calculating a first estimated proximity radius encompassing the payment card, the mobile electronic device, and the wearable device, based on the first RSSI data; classifying the first estimated proximity radius to be within a threshold; receive, from a chip reader, a request to authorize a transaction; obtain second RSSI data from the payment card, the mobile electronic device, and the wearable device; calculate a second estimated proximity radius encompassing the payment card, the mobile electronic device, and the wearable device based on the second RSSI data; using the trained machine learning model, determine that the second estimated proximity radius is within the threshold; and authorize, to the chip reader, the transaction.

In another implementation, a computer readable medium stores instructions for authorization. The instructions, when executed by a processor, cause the processor to pair a payment card to a mobile electronic device and a wearable device, the payment card including at least one of NFC or RFID capability; train a machine learning model by obtaining first received signal strength indicator (RSSI) data from the payment card, the mobile electronic device, and the wearable device at calibrated distances, calculating a first estimated proximity radius encompassing the payment card, the mobile electronic device, and the wearable device, based on the first RSSI data; classifying the first estimated proximity radius to be within a threshold; receive, from a chip reader, a request to authorize a transaction; obtain second RSSI data from the payment card, the mobile electronic device, and the wearable device; calculate a second estimated proximity radius encompassing the payment card, the mobile electronic device, and the wearable device based on the second RSSI data; using the trained machine learning model, determine that the second estimated proximity radius is within the threshold; and authorize, to the chip reader, the transaction.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
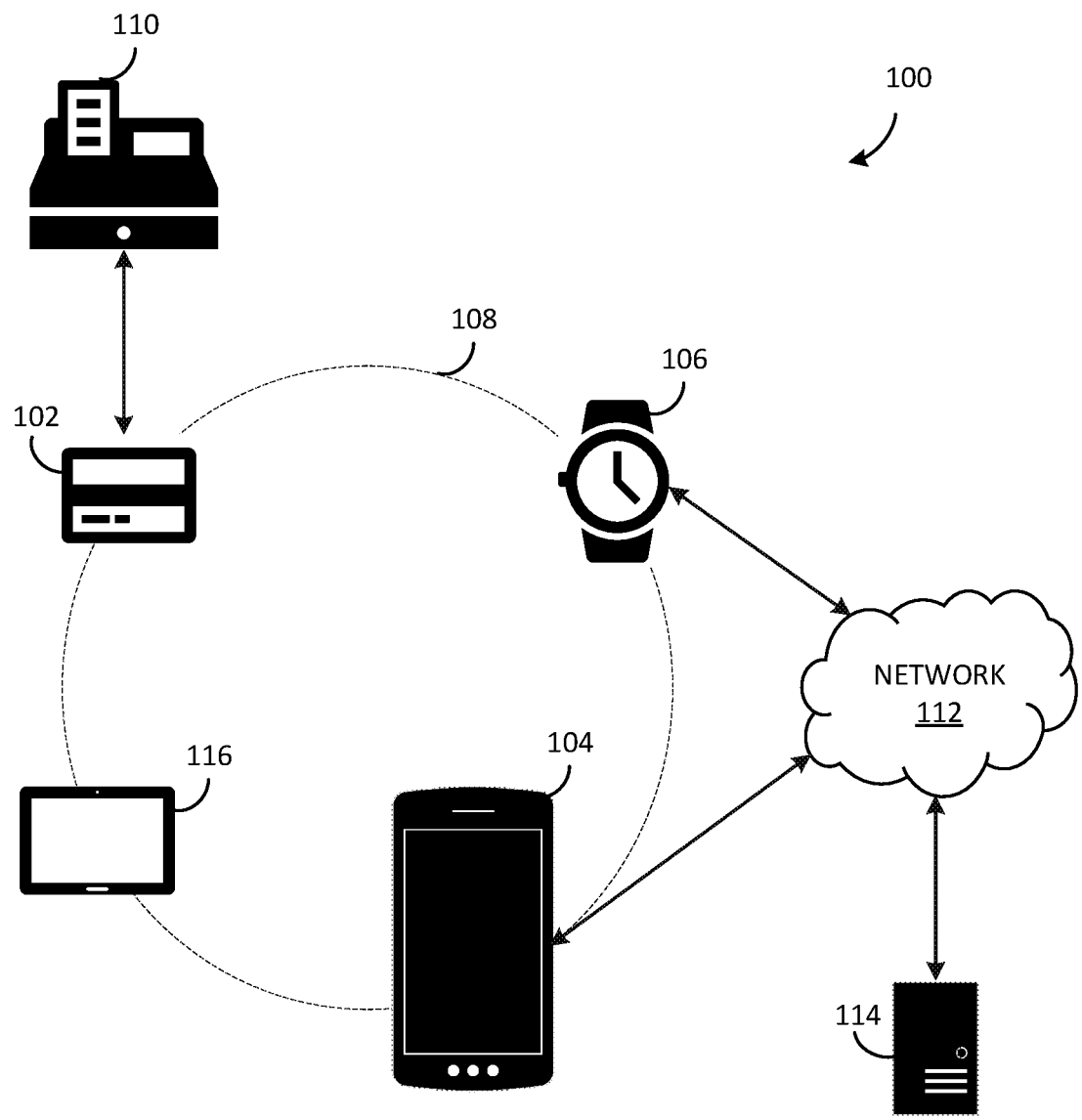
FIG. 1 illustrates a system for authorizing a transaction.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Current solutions for authorizing a credit or debit card transaction require user authentication. Authentication in some existing systems includes providing a PIN or signature after presenting the card at a POS terminal. Presenting the card includes swiping a magnetic stripe on the card in a magnetic stripe reader at the POS terminal, inserting a chip in the card into the POS terminal, or bringing the card near the POS terminal to utilize a contactless payment.

In the present disclosure, a user executing a transaction via card often has a mobile electronic device, a wearable electronic device, and sometimes other devices, such as a tablet, that are equipped with NFC and/or RFID technology. By recognizing that the mobile electronic device and/or the wearable electronic device are within an expected proximity of the card being used to execute the transaction, the user can be authenticated with improved usage of computing resources. For example, by not requiring a PIN or signature to be input and transmitted to an issuer server to review, network bandwidth is reduced. Further, the transaction can also be authorized with greater confidence, thus reducing fraud.

Accordingly, various implementations of the present disclosure provide a technical solution that implements NFC and/or RFID technology to estimate a proximity radius of recognized devices around a card being used to execute a transaction, compare the estimated radius to previous thresholds that have been used to authorize transactions, and authorize or deny the transaction based on whether the estimated radius of the recognized devices is within the previous threshold limits. The present disclosure also implements a machine learning (ML) model that is continuously trained and updated based on previous radius values in order to continually provide improved thresholds for a particular user profile.

The technical solution of using NFC and/or RFID technology in combination with machine learning is implemented in an unconventional manner at least by being used in real time to authorize or deny transactions and detect fraud. For example, NFC or RFID signals from anticipated devices not being present, or additional devices being present that were not anticipated to be present, can indicate the possibility that a requested transaction represents fraudulent activity. By continuously training, updating, and retraining a machine learning model based on the detection, or non-detection, of particular devices and payment cards and the distances between the devices and payment cards, fraudulent activity is detected in real-time and more effectively.

FIG. 1 illustrates a system for authorizing a transaction according to implementations of the present disclosure. The system 100 illustrated in FIG. 1 is provided for illustration only. Other examples of the system 100 can be used without departing from the scope of the present disclosure.

The system 100 includes a card 102, a mobile electronic device 104, and a wearable device 106. The card 102 can be a credit card, a debit card, a payment card, or any other suitable type of card that can be used to make a payment at a POS terminal, such as the POS terminal 110. In some implementations, the card 102 includes one or more of a magnetic stripe capable of being swiped at a POS terminal, a chip, such as a Europay, Mastercard, Visa (EMV) chip capable of being inserted into a POS terminal, and NFC/RFID technology capable of enabling contactless payment at a POS terminal when placed near the POS terminal. The magnetic stripe, chip, and NFC/RFID technology enables information to be passed to the POS terminal to execute a transaction.

The mobile electronic device 104 can be any type of mobile computing device or other portable device including, for example but without limitation, a mobile telephone, laptop, tablet, computing pad, netbook, and gaming device. The mobile electronic device 104 includes NFC/RFID technology. In some implementations, the mobile electronic device 104 is particular to a specific user similarly to the card 102. For example, a card 102 and a mobile electronic device 104 are each typically associated with a single user.

The wearable device 106 can be any type of mobile computing device or other portable device that is worn by the user, for example but without limitation, a watch, a ring, a bracelet, a necklace, a heart monitor, glasses, a head mounted device (HMD), or any other suitable wearable device. The wearable device 106 includes NFC/RFID technology. In some implementations, the wearable device 106 is particular to a specific user similarly to the card 102 and the mobile electronic device 104. For example, a card 102, a mobile electronic device 104, and a wearable device 106 are each typically used by only a single user.

Due to each of the card 102, the mobile electronic device 104, and the wearable device 106 being equipped with NFC and/or RFID technology, an estimated proximity radius 108 can be identified that includes each of the card 102, the mobile electronic device 104, and the wearable device 106. In other words, in implementations where the card 102, the mobile electronic device 104, and the wearable device 106 are each within a close proximity, each of the card 102, the mobile electronic device 104, and the wearable device 106 can be identified and recognized, and an estimated distance can be calculated.

For example, similar devices are likely to be detected in close proximity of the card 102 when executing a given transaction because a user is likely to have each of the card 102, the mobile electronic device 104, and the wearable device 106 on their person at the same time. A machine learning (ML) model, described in greater detail below, recognizes the particular mobile electronic device 104 and the wearable device 106 as regularly in close proximity with the card 102 when executing a transaction. Accordingly, the presence of the mobile electronic device 104 and the wearable device 106 within an expected radius of the card 102 increases the likelihood that the transaction is being executed by the owner of the card 102, and is therefore legitimate, and should be authorized. In contrast, the lack of presence of the mobile electronic device 104 or the wearable device 106 within the expected radius of the card 102 decreases the likelihood that the transaction is being executed by the owner of the card 102, and therefore the transaction may not be legitimate, so authorization may be denied.

In some implementations, the proximity radius 108 is determined based on received signal strength indicator (RSSI) data that is obtained from each of the card 102, the mobile electronic device 104, and the wearable device 106. For example, the mobile electronic device 104 receives RSSI data from the card 102 and the wearable device 106. The received RSSI data is transmitted to the server 114 via the network 112 and the server 114 estimates the distance of each element from the mobile electronic device 104 to calculate the proximity radius 108. Alternatively, the mobile electronic device 104 receives the RSSI data from the card 102 and the wearable device 106 and locally estimates the distance of each from the mobile electronic device 104 to calculate the proximity radius 108. In other implementations, the wearable device 106 receives the RSSI data from the card 102 and the mobile electronic device 104 and either transmits the RSSI data to the server 114 for calculation of the proximity radius 108 or locally estimates the proximity radius 108.

In some implementations, only one of the mobile electronic device 104 and the wearable device 106 is detected and included in the calculation of the proximity radius 108. For example, the mobile electronic device 104 can be detected and the wearable device 106 is not detected, or the wearable device 106 is detected and the mobile electronic device 104 is not detected. In some implementations, the lack of detection of one of the mobile electronic device 104 and the wearable device 106 results in a denial of authorization for the transaction. In other implementations, the transaction is authorized despite the lack of detection of one of the mobile electronic device 104 and the wearable device 106, for example due to a pattern of behavior associated with a profile which includes the card 102, the mobile electronic device 104, and the wearable device 106 that indicates one or both of the mobile electronic device 104 and the wearable device 106 are regularly not present for transactions executed with the card 102.

In some implementations, one or both of the mobile electronic device 104 and the wearable device 106 are configured to initiate the transaction. For example, one or both of the mobile electronic device 104 and the wearable device 106 may include an electronic wallet that stores payment information associated with the card 102 or another card, which can be used to initiate a contactless payment at the POS terminal 110. Where the mobile electronic device 104 is used to initiate the transaction, the proximity radius 108 can include one or both of the card 102 and the wearable device 106. Where the wearable device 106 is used to initiate the transaction, the proximity radius 108 can include one or both of the card 102 and the mobile electronic device 104.

One or both of the mobile electronic device 104 and the wearable device 106 are connected to a server 114 via a network 112. In some implementations, the server 114 includes a processor configured to execute the ML model to determine whether to authorize or deny the transaction and a memory configured to store data associated with the ML model, the card 102, the mobile electronic device 104, and the wearable device 106. In other implementations, one or both of the mobile electronic device 104 and the wearable device 106 are configured to execute the ML model and store data associated with the ML model, the card 102, the mobile electronic device 104, and the wearable device 106.

In some implementations, an additional device 116 is detected within the proximity radius 108 that includes the card 102, the mobile electronic device 104, and the wearable device 106. In other words, NFC or RFID signals are detected in proximity to the NFC or RFID signals detected from the card 102, the mobile electronic device 104, and the wearable device 106. In some implementations, the additional device 116 is an additional device associated with the user executing the transaction. However, in other implementations the additional device 116 is not associated with the user. For example, the additional device 116 can be associated with a sales associate processing the transaction or associated with another customer within the immediate proximity of the user, such as in a checkout line. In yet other implementations, such as where the integrity of the card 102 has been compromised, the additional device 116 is a device associated with someone, other than the user, attempting to process a transaction via the card 102.

As described in greater detail below, one or more of the mobile electronic device 104, the wearable device 106, and the server 114 determines whether the additional device 116 is associated with the user of the card 102, the mobile electronic device 104, and the wearable device 106. In implementations where the additional device 116 is associated with the user, a prompt may be displayed on the mobile electronic device 104 or the wearable device 106 suggesting an addition of the additional device 116 to a user profile that includes the card 102, the mobile electronic device 104, and the wearable device 106. In some implementations, where the additional device 116 is not determined to be associated with the user, a prompt may be displayed on the mobile electronic device 104 or the wearable device 106 requesting the user confirm the transaction.

Figure 2:
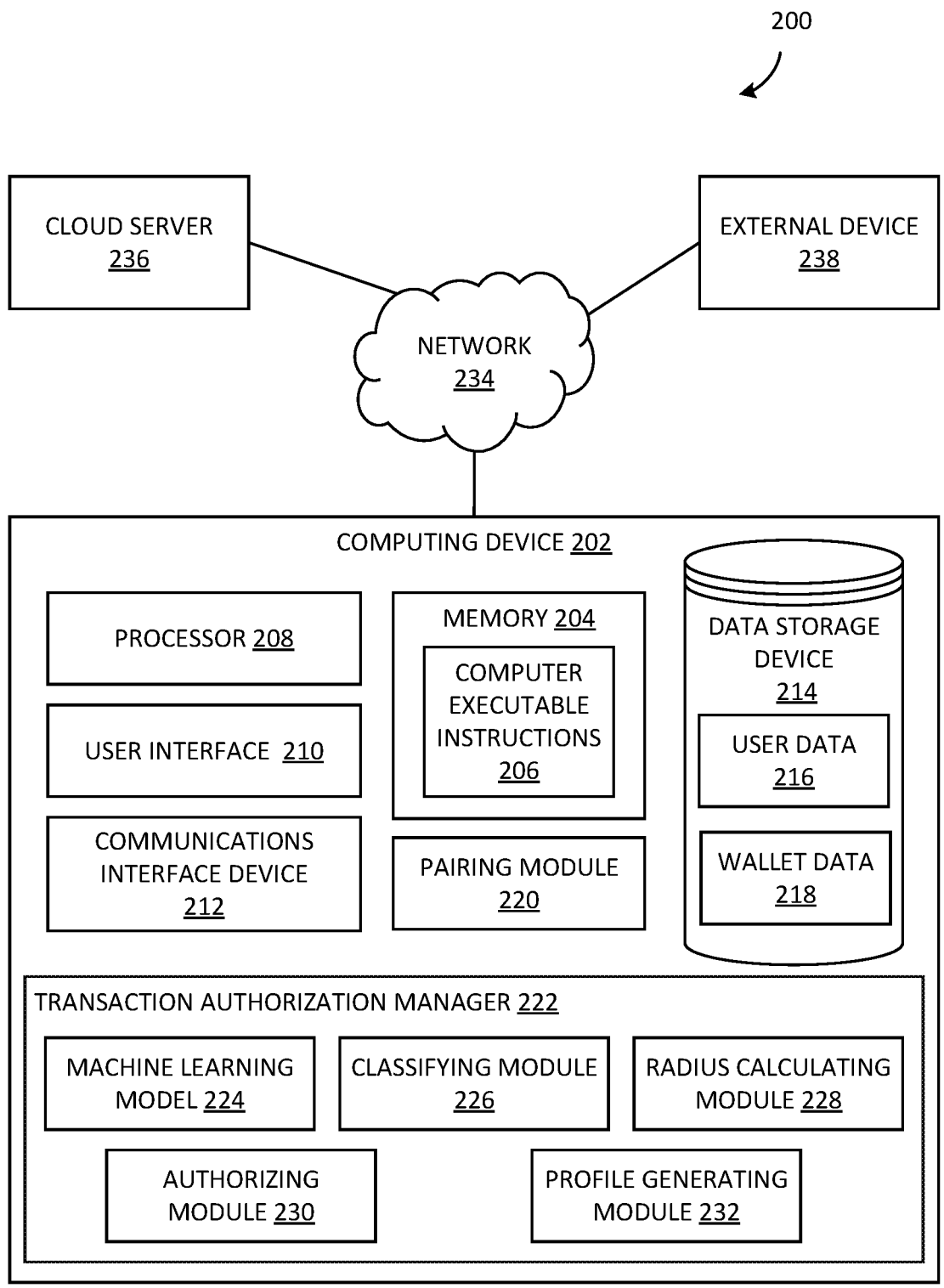
FIG. 2 is a block diagram illustrating an example device for authorizing a transaction.

FIG. 2 is a block diagram illustrating an example system for authorizing a transaction. The system 200 illustrated in FIG. 2 is provided for illustration only. Other examples of the system 200 can be used without departing from the scope of the present disclosure.

The system 200 includes a computing device 202, an external device 238, and a cloud server 236. Each of the computing device 202, the external device 238, and the cloud server 236 are communicatively coupled to and communicate via a network 234. The computing device 202 represents any device executing computer-executable instructions 206 (e.g., as application programs, operating system functionality, or both) to implement the operations and functionality associated with the computing device 202. The computing device 202, in some examples, includes a mobile computing device or any other portable device. A mobile computing device can include servers, desktop computers, kiosks, IoT devices, or tabletop devices. Additionally, the computing device 202 can represent a group of processing units or other computing devices. In some examples, the computing device 202 is a device executed in the cloud. In some implementations, the computing device 202 is one of the mobile electronic device 104 or the wearable device 106. In other implementations, the computing device 202 is the server 114.

In some examples, the computing device 202 includes at least one processor 208, a memory 204 that includes the computer-executable instructions 206, and a user interface 210. The processor 208 includes any quantity of processing units, including but not limited to a CPU or units, a graphics processing unit (GPU) or units, and a neural processing unit (NPU) or units. The processor 208 is programmed to execute the computer-executable instructions 206. The computer-executable instructions 206 are performed by the processor 208, performed by multiple processors within the computing device 202, or performed by a processor external to the computing device 202. In some examples, the processor 208 is programmed to execute computer-executable instructions 206 such as those illustrated in the figures described herein, such as FIGS. 3-7. In various examples, the processor 208 is configured to execute one or more communications interface device 212, data storage device 214, pairing module 220, and transaction authorization manager 222 as described in greater detail below. In other words, the communications interface device 212, data storage device 214, pairing module 220, and transaction authorization manager 222 are implemented on and/or by the processor 208.

The memory 204 includes any quantity of media associated with or accessible by the computing device 202. The memory 204 in these examples is internal to the computing device 202, as illustrated in FIG. 2. In other examples, the memory 204 is external to the computing device 202 or both internal and external to the computing device 202. For example, the memory 204 can include both a memory component internal to the computing device 202 and a memory component external to the computing device 202. The memory 204 stores data, such as one or more applications. The applications, when executed by the processor 208, operate to perform various functions on the computing device 202. The applications can communicate with counterpart applications or services, such as web services accessible via the network 234. In an example, the applications represent downloaded client-side applications that correspond to server-side services executing in a cloud, such as the cloud server 236.

The user interface 210 includes a graphics card for displaying data to a user and receiving data from the user. The user interface 210 can also include computer-executable instructions, for example a driver, for operating the graphics card. Further, the user interface 210 can include a display, for example a touch screen display or natural user interface, and/or computer-executable instructions, for example a driver, for operating the display. In some examples, the touch screen display of the user interface 210 enables the user to select a network protocol to utilize for executing cross-device communication, as described in greater detail below. The user interface 210 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 202 in one or more ways.

The communications interface device 212 includes a network interface card and/or computer-executable instructions, such as a driver, for operating the network interface card. Communication between the computing device 202 and other devices, such as but not limited to the cloud server 236, can occur using any protocol or mechanism over any wired or wireless connection. In some examples, the communications interface device 212 is operable with short range communication technologies such as by using NFC tags or RFID.

The computing device 202 further includes a data storage device 214 for storing data, such as, but not limited to user data 216 and wallet data 218. The user data 216 includes the personal data corresponding to a particular user or consumer. For example, the user data 216 can include, but is not limited to, a first name, last name, gender, date of birth, current address, previous addresses, mobile number or numbers, telephone number or numbers, bank account information, credit card numbers, and electronic mail (e-mail) address or addresses. In some implementations, the user data 216 includes electronic devices, such as the mobile electronic device 104, the wearable device 106, and the additional device 116, that are authorized and paired with the card 102, the information of which is stored in a profile of the user data 216. The profile can be generated by the profile generating module 232 and is described in greater detail below.

The wallet data 218 includes financial data corresponding to a particular user or consumer. For example, the wallet data 218 can include but is not limited to bank account information, credit card information, financial institution information, and so forth. In some implementations, the wallet data 218 includes some information also stored as the user data 216, such as bank account information and credit card numbers. In some implementations, the wallet data 218 includes electronic devices, such as the mobile electronic device 104, the wearable device 106, and the additional device 116, that are authorized and paired with the card 102, the information of which is stored in the wallet data 218.

It should be understood that although the user data 216 and wallet data 218 are described as stored in the data storage device 214 of the computing device 202, various implementations are possible. For example, the user data 216 can be stored on the cloud server 236 or on an external device 238 such as the user's mobile phone, and the wallet data 218 is stored on the cloud server 236 or on an external device 238 such as a server of a financial institution.

The data storage device 214, in this example, is included within the computing device 202, attached to the computing device 202, plugged into the computing device 202, or otherwise associated with the computing device 202. In other examples, the data storage device 214 includes a remote data storage accessed by the computing device 202 via the network 234, such as a remote data storage device, a data storage in a remote data center, or a cloud storage.

The pairing module 220 pairs devices commonly owned and used by a user. For example, the pairing module 220 pairs the card 102 to the mobile electronic device 104 and the wearable device 106, and pairs the mobile electronic device 104 to the wearable device 106. In this way, the card 102, the mobile electronic device 104, and the wearable device 106 recognize each other based on the NFC or RFID signals.

The transaction authorization manager 222 includes one or more of a ML model 224, a classifying module 226, a radius calculating module 228, an authorizing module 230, and a profile generating module 232. In some implementations, the transaction authorization manager 222 is a special purpose computer, or processor, implemented on or by the processor 208 that executes particular computer-executable instructions 206 stored on the memory 204 to perform the specific process of authorizing or denying a transaction request received from a POS terminal 110 after a card 102, mobile electronic device 104, or wearable device 106 is presented to the POS terminal 110 to execute a transaction at the POS terminal 110.

The ML model 224 is continuously trained and updated in order to determine optimal thresholds for the proximity radius 108 and determine, in real time, whether a received proximity radius 108 for a particular transaction is within the determined threshold. For example, the ML model 224 obtains RSSI data, via the communications interface device 212, from the card 102, the mobile electronic device 104, and the wearable device 106. The RSSI data identifies each device, for example, with a service set identifier (S SID), a device identifier (ID), and location coordinates for each of the card 102, the mobile electronic device 104, and the wearable device 106. The radius calculating module 228 calculates an estimated proximity radius 108 that encompasses each of the card 102, the mobile electronic device 104, and the wearable device 106 based on the received RSSI data. The radius calculating module 228 calculates the estimated proximity radius 108 using different means. In an implementation, the radius calculating module 228 calculates the estimated proximity radius 108 using a Euclidean distance formula, such as shown in Equation 1.

$$d(x, y) = \sqrt{\sum_{k=1}^{n}(x_k - y_k)^2}, \qquad \text{Equation 1}$$

In other implementations, the radius calculating module 228 calculates the estimated proximity radius 108 using a Kernel Density Estimation, given by a propagation model as shown in Equation 2.

$$P(d) = P(d_0) - 10 \times n \times \log d/d_0 - X \qquad \text{Equation 2}$$

As shown in Equation 2, the received signal strength P(d) as a function of the signal power P(d0) at a reference distance $d_0$ from the transmitter mobile electronic device 104 or wearable device 106 and the distance d from the card 102 and the mobile electronic device 104 or wearable device 106. Further, n represents the path loss exponent and X represents a component which reflects the sum of losses induced by each wall between the card 102 and mobile electronic device 104 or wearable device 106.

The classifying module 226 classifies the calculated estimated proximity radius 108 as either within or not within the threshold determined by the ML model 224. The authorizing module 230 authorizes the transaction based on the calculated estimated proximity radius 108 being within the threshold or denies the transaction based on the calculated estimated proximity radius 108 not being within the threshold. The results of the transaction, e.g., whether the authorizing module 230 authorizes or denies the transaction for the particular proximity radius 108, are returned to the ML model 224 and the ML model 224 is updated. Updating the ML model 224 continuously trains the ML model 224 in order to update the threshold used to authorize or deny future transaction requests.

In some implementations, the ML model 224 implements a training step to train the ML model 224 and the classifying module 226. For example, the ML model 224 fetches a set of RSSI data from one or more devices at pre-calibrated distances. The ML model 224 creates a simulated training environment by applying the model to all the points collected at the pre-calibrated distances. The ML model 224 uses the simulated training environment to train the classifying module 226 to determine whether the various pre-calibrated distances are within a threshold. As new transaction requests are received and new RSSI data is received from payment cards 102, mobile electronic devices 104, and wearable devices 106, the ML model 224 executes on the received RSSI data and the classifying module 226 is able to make more precise determinations on whether the calculated proximity radius 108 from the received RSSI data is within the threshold.

As additional RSSI data is received for additional transaction requests, the ML model 224 is continually trained and updated in order to optimize the threshold for authorizing a transaction. In some implementations, the ML model 224 identifies a range of proximity radiuses 108, or an average proximity radius 108, of the card 102, the mobile electronic device 104, and the wearable device 106.

The profile generating module 232 generates a profile for the user that includes user data 216 and wallet data 218. In other words, the profile includes a user's name, card 102 information, and device information of devices paired to the card 102. For example, the profile can include the card 102 and IP addresses or SSID information corresponding to the mobile electronic device 104 and the wearable device 106 when they are paired to the card 102 by the pairing module 220. The devices included in the profile are the devices anticipated to be detected with NFC or RFID data in proximity to the card 102 when a transaction request is received.

In some implementations, the profile generated by the profile generating module is dynamic. In other words, the profile can be updated to include new devices, devices can be removed, and the weight given to different devices can be changed based on the results of training the ML model 224. For example, the ML model 224 identifies that some devices are present with the card 102 during a transaction more often than other devices and updates the algorithm to weight the presence of the devices present more often more heavily. For example, the ML model 224 can recognize that the mobile electronic device 104 is almost always present when the card 102 is presented to execute a transaction, but the wearable device 106 is present only half the time the card 102 is presented to execute a transaction. This can indicate the user almost always has their mobile device on their person but only sometimes wears the wearable device. Thus, the ML model 224 is updated to view the presence of the RSSI data from the mobile electronic device 104 within the proximity radius 108 as a stronger indication the transaction is legitimate and should be authorized and to view the lack of presence of RSSI data from the wearable device 106 within the proximity radius 108 as less of an indication the transaction may be illegitimate and should be denied. These indications translate to different weights being applied in the ML model 224. Based on the ML model 224 being updated, the profile generating module 232 updates the profile to weight the presence, or lack of, of the mobile electronic device 104 more than the presence, or lack of, of the wearable device 106. In some implementations, the mobile electronic device 104 is classified as a primary device for the profile.

In some implementations, where the additional device 116 is detected within the proximity radius 108, the profile generating module 232 updates the profile to include the additional device 116. The additional device 116 can be added to the profile automatically, for example after the additional device 116 is detected during a certain number of transactions, or in response to the user identifying the additional device 116 as an approved device to be added to the profile. For example, a prompt can be displayed on the user interface 210 of one or both of the mobile electronic device 104 and the wearable device 106 for the user to confirm the additional device 116 is to be added to the profile. The user can either accept or deny the addition of the additional device 116 by responding to the displayed prompt on the user interface 210.

Figure 3:
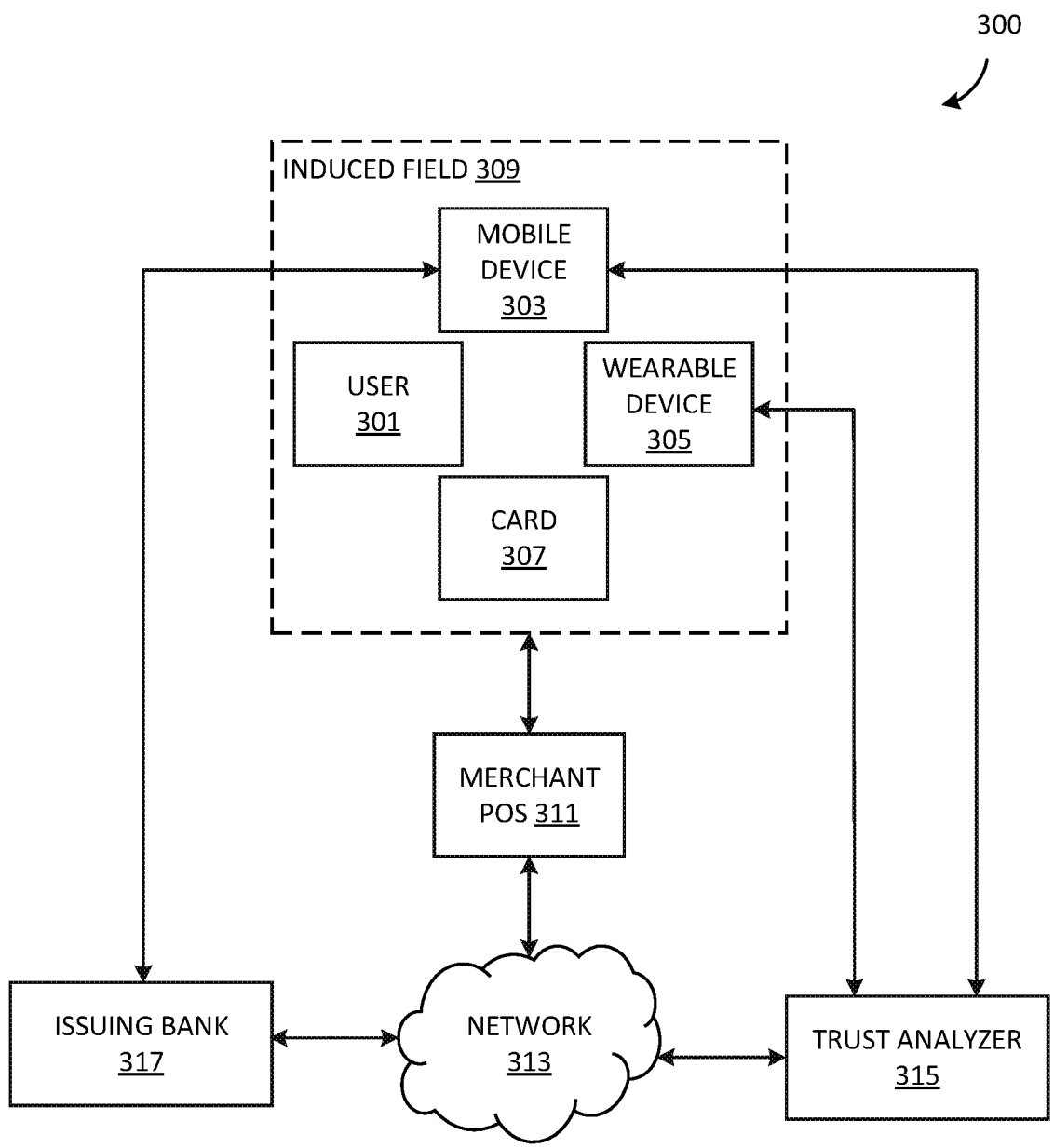
FIG. 3 is a block diagram illustrating an example system for authorizing a transaction.

FIG. 3 is a block diagram illustrating an example system for authorizing a transaction. The system 300 illustrated in FIG. 3 is provided for illustration only. Other examples of the system 300 can be used without departing from the scope of the present disclosure.

The system 300 includes a mobile electronic device 303, a wearable device 305, and a payment card 307. The mobile electronic device 303 can be the mobile electronic device 104, the wearable device 305 can be the wearable device 106, and the payment card 307 can be the card 102. The system 300 further includes an induced field 309 surrounding each of the mobile electronic device 303, the wearable device 305, and the payment card 307. In some implementations, the induced field 309 further includes a user 301. The user 301 can present the payment card 307 at a POS terminal, such as the merchant POS 311, to execute a transaction. The induced field 309 can include the proximity radius 108 illustrated in FIG. 1 and indicates the physical presence of the mobile electronic device 303, the wearable device 305, and the payment card 307 in proximity to the user 301.

The merchant POS 311 can be the POS terminal 110. The merchant POS 311 receives an indication of a transaction, such as by the user 301 presenting one of the mobile electronic device 303, the wearable device 305, and the payment card 307 as described herein. The merchant POS 311 reads the information associated with the payment method presented by the payment card 307 and communicates the transaction request to a network 313. In some implementations, the network 313 communicates the request to a trust analyzer 315, which determines whether the request is trustworthy and whether the transaction should be approved. For example, the trust analyzer 315 can be the transaction authorization manager 222 or be implemented as part of the transaction authorization manager 222 as described. The trust analyzer 315 determines the user proximity to the merchant POS 311, such as by determining a proximity of the mobile electronic device 303 and the wearable device 305 to the payment card 307, and determining the proximity is within the threshold determined by the ML model 224.

In implementations where the trust analyzer 315 determines the transaction request can be trusted and the transaction request is authorized, the issuing bank 317 receives a request to execute the transaction. For example, the issuing bank 317 can be a provider of the payment card 307 such as a credit card provider, a bank providing the payment card 307 such as a debit card provider, or any other provider of the payment card 307. Upon receiving the request to execute the transaction, the issuing bank 317 authorizes the transaction via the network 313 and the merchant POS 311 executes the transaction.

In some implementations, the trust analyzer 315 determines additional information is required before authorizing the transaction. For example, where an expected device, such as the mobile electronic device 303 or the wearable device 305, is not determined to be within the induced field 309 but another device is within the induced field 309, the trust analyzer 315 may determine manual confirmation or verification is required before authorizing the transaction. In these implementations, the trust analyzer 315 contacts the user 301 via the mobile electronic device 303 and/or the wearable device 305 to confirm the transaction request. In some implementations, the trust analyzer 315 causes a prompt to either accept or deny the requested transaction to the device determined to be within the induced field 309. In other implementations, the trust analyzer 315 causes a prompt to either accept or deny the requested transaction to the device expected to be within the induced field 309 but that was not detected. In other implementations, the trust analyzer 315 causes a prompt to either accept or deny the requested transaction to both the mobile electronic device 303 and the wearable device 305.

Upon receiving a deny input in response to the prompt, or not receiving an input in response to the prompt within a threshold amount of time, the trust analyzer 315 denies the transaction via the network 313 and the merchant POS 311 does not execute the transaction. Upon receiving an accept input in response to the prompt, the trust analyzer 315 authorizes the transaction via the network 313, sends a request to execute the transaction to the issuing bank 317, and the merchant POS 311 executes the transaction.

In some implementations, the issuing bank 317 notifies the user 301 of the transaction by transmitting a signal to the mobile electronic device 303. For example, the issuing bank 317 can send a notification that the transaction has been executed. As another example, the issuing bank 317 can send a prompt to the mobile electronic device 303 requesting the user 301 accept or deny the transaction request. The user 301 can provide an input to the mobile electronic device 303 to accept or deny the transaction request.

Figure 4A:
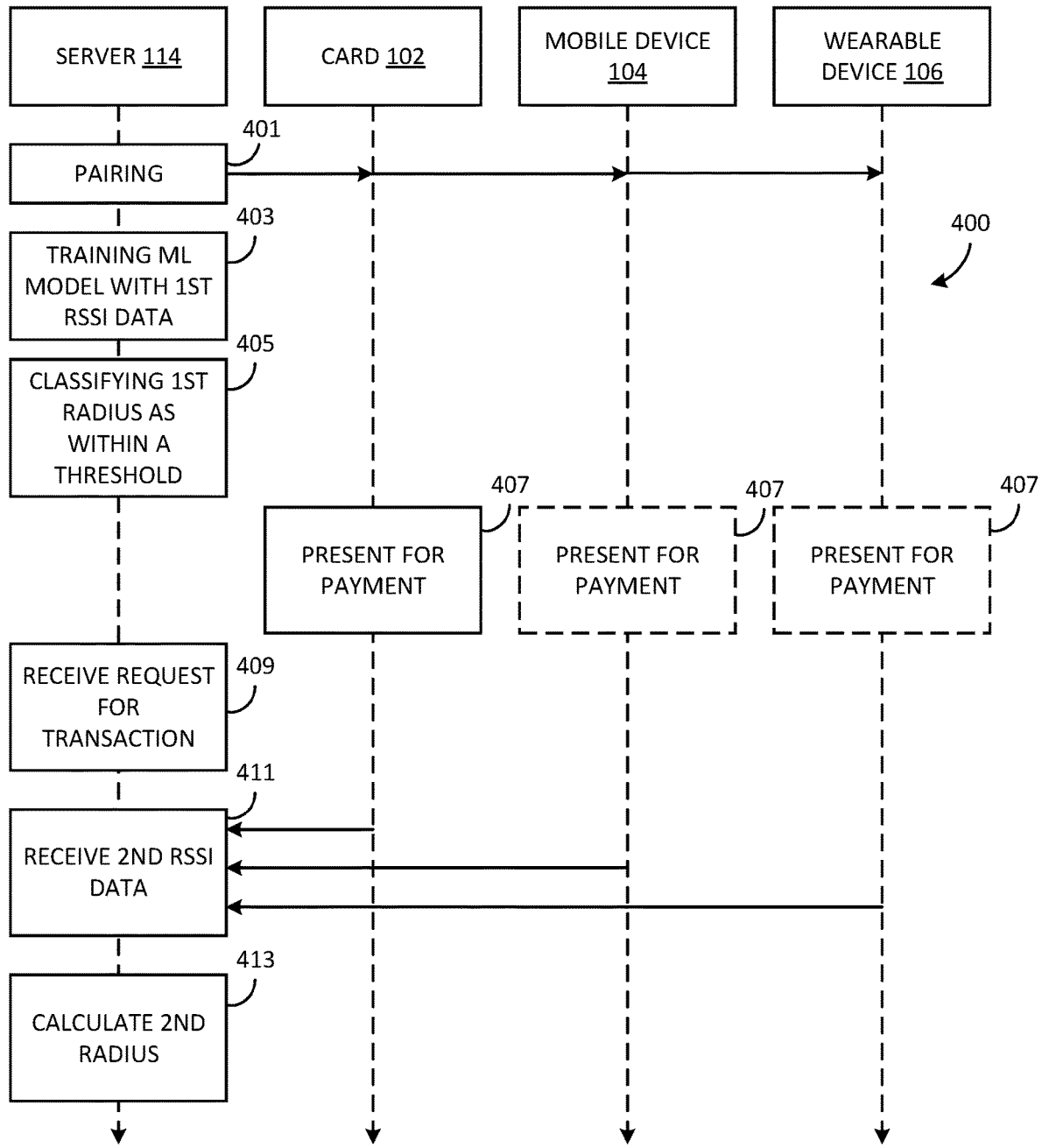
FIGS. 4A-4B are example computerized methods of authorizing a transaction.
Figure 4B:
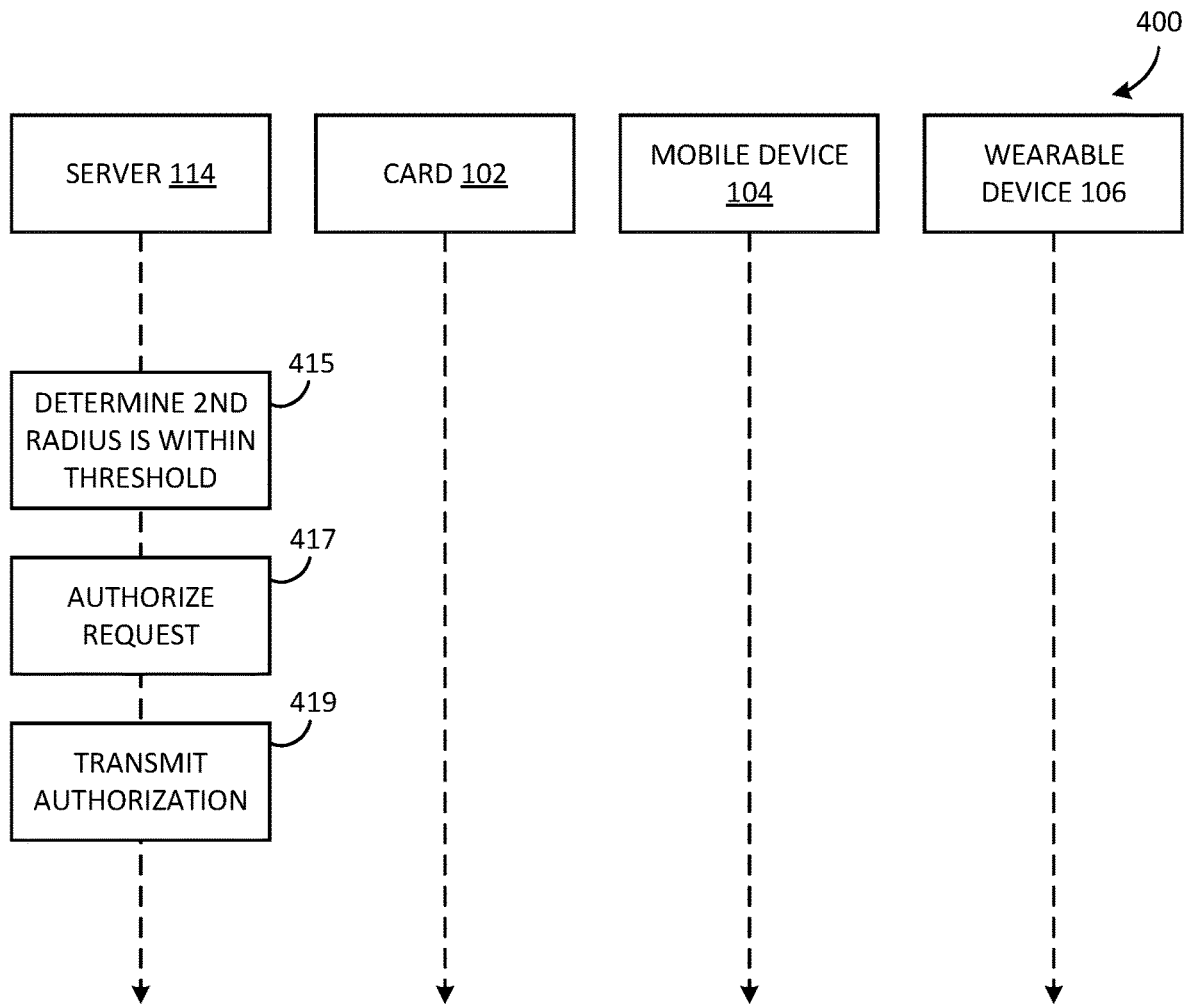

FIGS. 4A-4B are an example computerized method of authorizing a transaction. These flowcharts illustrate various options, not all of which are required for any one implementation. The method 400 illustrated in FIGS. 4A and 4B is for illustration only. FIG. 4B extends FIG. 4A and is a continuation of the method 400 which begins in FIG. 4A. Other examples of the method 400 can be used without departing from the scope of the present disclosure. The method 400 can be implemented by one or more components of the system 100 illustrated in FIG. 1 or the system 200 illustrated in FIG. 2, such as the components of the example computing device 800 described in greater detail below in the description of FIG. 8. For example, FIGS. 4A and 4B illustrate the method 400 as performed by the card 102, the mobile electronic device 104, the wearable device 106, and the server 114 of the system 100, but various examples are contemplated. In the example illustrated in FIGS. 4A and 4B, the server 114 is the computing device 202.

The method 400 begins by the server 114 pairing the card 102, the mobile electronic device 104, and the wearable device 106 in operation 401. Accordingly, each of the card 102, the mobile electronic device 104, and the wearable device 106 recognize one another based on specific, exchanged NFC or RFID signals. In some implementations, the paired devices are stored in a profile of a particular user that associates each of the card 102, the mobile electronic device 104, and the wearable device 106 with the user. The user profile can be stored on one or more of the server 114, the mobile electronic device 104, and the wearable device 106.

In operation 403, the server 114 trains the ML model 224 with first RSSI data. The first RSSI data can be RSSI data received at calibrated distances to establish the strength and directionality of RSSI data, such as NFC or RFID data, received from the different devices. When the first RSSI data is received, a first proximity radius 108 is calculated that encompasses the card 102, the mobile electronic device 104, and the wearable device 106. The calculated proximity radius 108 is determined to be either within a threshold or not within the threshold. For example, in operation 405, the calculated first proximity radius 108 is classified as within a threshold. In some implementations, RSSI data is received at multiple calibrated distances to establish the threshold and determine, for the particular user, whether the card 102, the mobile electronic device 104, and the wearable device 106 are near enough to one another that the user should be authenticated, and hence the transaction should be authorized.

In operation 407, the card 102 is presented for payment as part of a transaction. For example, the card 102 is presented to the POS terminal 110 by swiping the card 102, inserting the card 102 into the POS terminal 110, or bringing the card 102 into a near enough proximity to the POS terminal 110 to initiate a contactless payment. It should be understood that the payment can be initiated in operation 405 by mechanisms other than the card 102. In some implementations, either the mobile electronic device 104 or the wearable device 106 is presented at the POS terminal 110 for payment as part of the transaction.

In operation 409, the server 114 receives a request for the transaction initiated by one of the card 102, the mobile electronic device 104, and the wearable device 106. The server 114 receives the request for the transaction from the POS terminal 110, or the chip reader of the POS terminal 110, where one of the card 102, the mobile electronic device 104, and the wearable device 106 was presented in operation 407.

In operation 411, the server 114 obtains second RSSI data from payment cards and devices surrounding the device or payment card which was presented for payment in operation 407. For example, where the card 102 was presented for the transaction, the server 114 obtains RSSI data from the card 102 and any electronic devices in the proximity of the card 102, including the mobile electronic device 104 and the wearable device 106. In implementations where, for example, the wearable device 106 is detected within the proximity of the card 102 and the mobile electronic device 104 is not detected, RSSI data is obtained from the wearable device 106 and the server 114 is informed of the lack of RSSI data detected from the mobile electronic device 104. As another example, where the mobile electronic device 104 was presented for payment, the server 114 obtains data from the mobile electronic device 104, the card 102, and the wearable device 106.

In some implementations, the server 114 obtains RSSI data from devices that are not associated with the card 102, the mobile electronic device 104, and the wearable device 106. For example, additional devices can be located proximate to the POS terminal 110 and the card 102, such as a device belonging to or used by a sales associate or other customers in an area where the POS terminal 110 is located. In these implementations, the server 114 identifies the mobile electronic device 104 and the wearable device 106 as approved devices associated with the card 102 for the transaction. Accordingly, the server 114 identifies the obtained RSSI data from non-associated devices and ignores this data. In other words, the RSSI data obtained from non-associated devices is not used in the additional operations of method 400.

In operation 413, the server 114 calculates a second proximity radius 108 that encompasses the card 102, the mobile electronic device 104, and the wearable device 106. In implementations where additional RSSI data is obtained from extraneous devices or cards, the additional RSSI data is ignored and not used for the calculation of the second proximity radius 108. As described herein, the server 114 can calculate the second proximity radius 108 using a Euclidean distance formula, a Kernel Density Estimation, or any other suitable means. In some implementations, a value corresponding to the calculated second proximity radius 108 is saved and stored on the server 114 to be used to further train the ML model 224.

In operation 415, the server 114 determines the second proximity radius 108 is within the threshold determined by the ML model 224. The server 114 compares the second proximity radius 108 to the threshold and, based on determining the second proximity radius 108 is less than or equal to the threshold, authorizes the transaction in operation 417 and transmits authorization of the transaction to the POS terminal 110 in order for the transaction to be executed at the POS terminal 110.

In some implementations, the server 114 compares the second proximity radius 108 to the threshold and determines the second proximity radius 108 is greater than the threshold. Then, the server 114 denies the transaction and transmits a signal denying the transaction to the POS terminal 110. Based on the signal denying the transaction, the transaction is not executed.

Figure 5A:
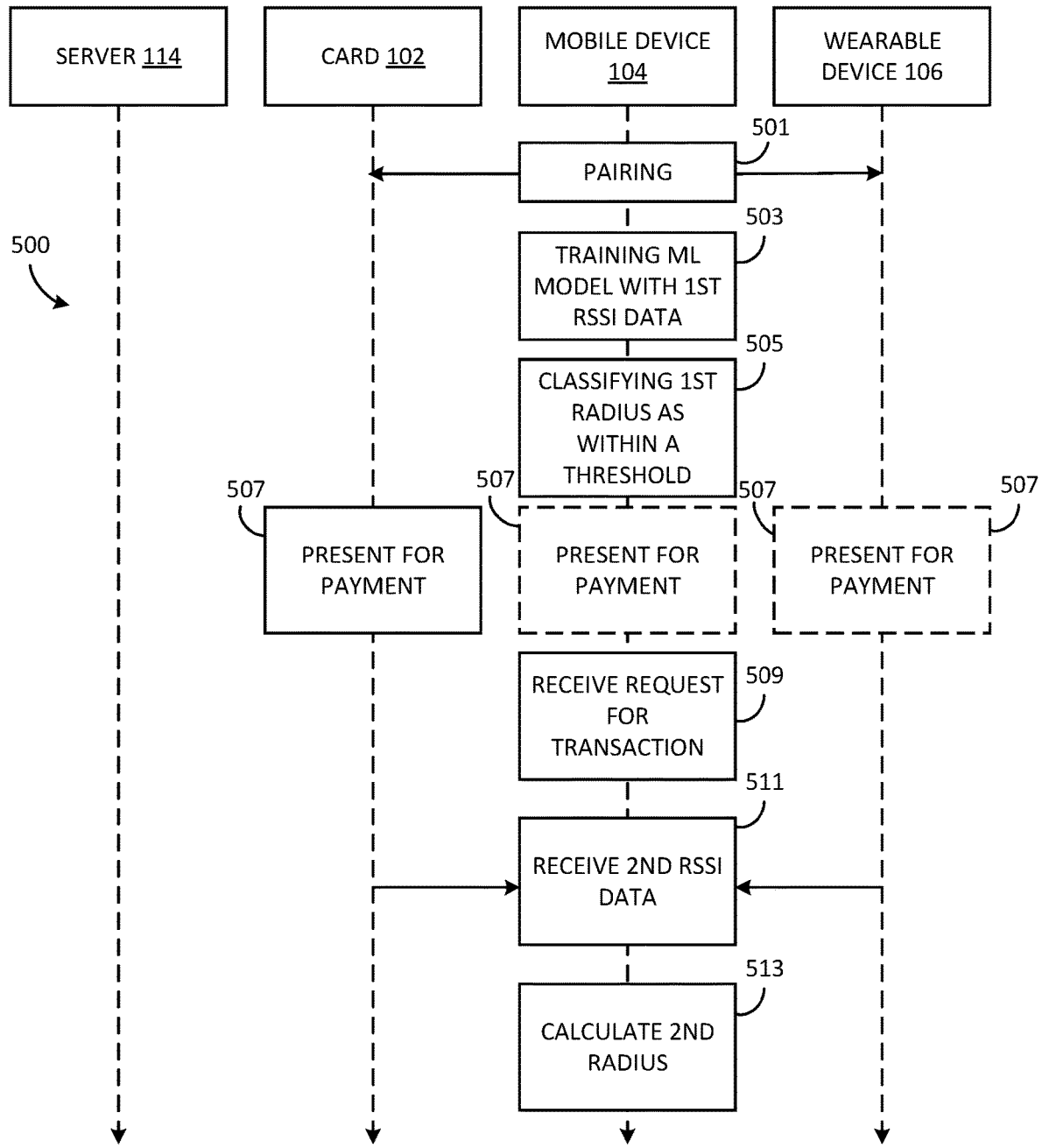
FIGS. 5A-5B are additional example computerized methods of authorizing a transaction.
Figure 5B:
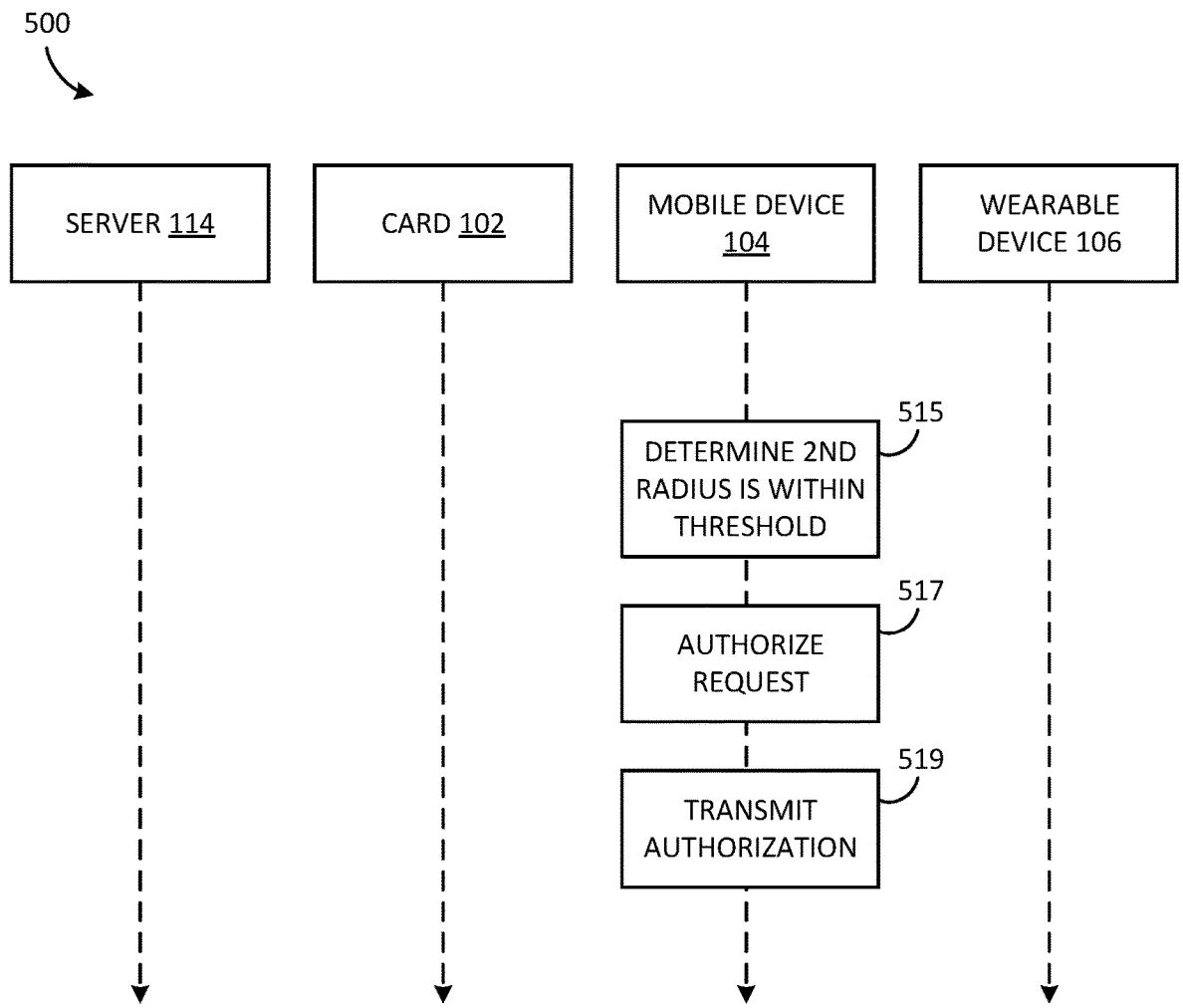

FIGS. 5A-5B are an example computerized method of authorizing a transaction. These flowcharts illustrate various options, not all of which are required for any one implementation. The method 500 illustrated in FIGS. 5A and 5B is for illustration only. FIG. 5B extends FIG. 5A and is a continuation of the method 500 which begins in FIG. 5A. Other examples of the method 500 can be used without departing from the scope of the present disclosure. The method 500 can be implemented by one or more components of the system 100 illustrated in FIG. 1 or the system 200 illustrated in FIG. 2, such as the components of the example computing device 800 described in greater detail below in the description of FIG. 8. For example, FIGS. 5A and 5B illustrate the method 500 as performed by the card 102, the mobile electronic device 104, the wearable device 106, and the server 114 of the system 100, but various examples are contemplated. In the example illustrated in FIGS. 5A and 5B, the mobile electronic device 104 is the computing device 202.

The method 500 begins by the mobile electronic device 104 pairing the card 102, the mobile electronic device 104, and the wearable device 106 in operation 501. Accordingly, each of the card 102, the mobile electronic device 104, and the wearable device 106 recognize one another based on specific, exchanged NFC or RFID signals. In some implementations, the paired devices are stored in a profile of a particular user that associates each of the card 102, the mobile electronic device 104, and the wearable device 106 with the user. The user profile can be stored on one or more of the server 114, the mobile electronic device 104, and the wearable device 106.

In operation 503, the mobile electronic device 104 trains the ML model 224 with first RSSI data. The first RSSI data can be RSSI data received at calibrated distances to establish the strength and directionality of RSSI data, such as NFC or RFID data, received from the different devices. When the first RSSI data is received, a first proximity radius 108 is calculated that encompasses the card 102, the mobile electronic device 104, and the wearable device 106. The calculated proximity radius 108 is determined to be either within a threshold or not within the threshold. For example, in operation 505, the calculated first proximity radius 108 is classified as within a threshold. In some implementations, RSSI data is received at multiple calibrated distances to establish the threshold and determine, for the particular user, whether the card 102, the mobile electronic device 104, and the wearable device 106 are near enough to one another that a transaction should be authorized.

In operation 507, the card 102 is presented for payment as part of a transaction. For example, the card 102 is presented to the POS terminal 110 by swiping the card 102, inserting the card 102 into the POS terminal 110, or bringing the card 102 into a near enough proximity to the POS terminal 110 to initiate a contactless payment. It should be understood that the payment can be initiated in operation 505 by mechanisms other than the card 102. In some implementations, either the mobile electronic device 104 or the wearable device 106 is presented at the POS terminal 110 for payment as part of the transaction.

In operation 509, the mobile electronic device 104 receives a request for the transaction initiated by one of the card 102, the mobile electronic device 104, and the wearable device 106. The mobile electronic device 104 receives the request for the transaction from the POS terminal 110, or the chip reader of the POS terminal 110, where one of the card 102, the mobile electronic device 104, and the wearable device 106 was presented in operation 507.

In operation 511, the mobile electronic device 104 obtains second RSSI data from payment cards and devices surrounding the device or payment card which was presented for payment in operation 507. For example, where the card 102 was presented for the transaction, the mobile electronic device 104 obtains RSSI data from the card 102 and any electronic devices in the proximity of the card 102, including the wearable device 106. In implementations where, for example, the mobile electronic device 104 is detected within the proximity of the card 102 and the wearable device 106 is not detected, RSSI data is obtained from the mobile electronic device 104 and the mobile electronic device 104 is informed of the lack of RSSI data detected from the wearable device 106. As another example, where the mobile electronic device 104 was presented for payment, the server 114 obtains data from the mobile electronic device 104, the card 102, and the wearable device 106.

In some implementations, the mobile electronic device 104 obtains RSSI data from devices that are not associated with the card 102, the mobile electronic device 104, and the wearable device 106. For example, additional devices can be located proximate to the POS terminal 110 and the card 102, such as a device belonging to or used by a sales associate or other customers in an area where the POS terminal 110 is located. In these implementations, the mobile electronic device 104 identifies the mobile electronic device 104 and the wearable device 106 as approved devices associated with the card 102 for the transaction. Accordingly, the mobile electronic device 104 identifies the obtained RSSI data from non-associated devices and ignores this data. In other words, the RSSI data obtained from non-associated devices is not used in the additional operations of method 500.

In operation 513, the mobile electronic device 104 calculates a second proximity radius 108 that encompasses the card 102, the mobile electronic device 104, and the wearable device 106. In implementations where additional RSSI data is obtained from extraneous devices or cards, the additional RSSI data is ignored and not used for the calculation of the second proximity radius 108. As described herein, the mobile electronic device 104 can calculate the second proximity radius 108 using a Euclidean distance formula, a Kernel Density Estimation, or any other suitable means. In some implementations, a value corresponding to the calculated second proximity radius 108 is saved and stored on the mobile electronic device 104 to be used to further train the ML model 224.

In operation 515, the mobile electronic device 104 determines the second proximity radius 108 is within the threshold determined by the ML model 224. The mobile electronic device 104 compares the second proximity radius 108 to the threshold and, based on determining the second proximity radius 108 is less than or equal to the threshold, authorizes the transaction in operation 517 and transmits authorization of the transaction to the POS terminal 110 in order for the transaction to be executed at the POS terminal 110.

In some implementations, the mobile electronic device 104 compares the second proximity radius 108 to the threshold and determines the second proximity radius 108 is greater than the threshold. Then, the mobile electronic device 104 denies the transaction and transmits a signal denying the transaction to the POS terminal 110. Based on the signal denying the transaction, the transaction is not executed.

Figure 6A:
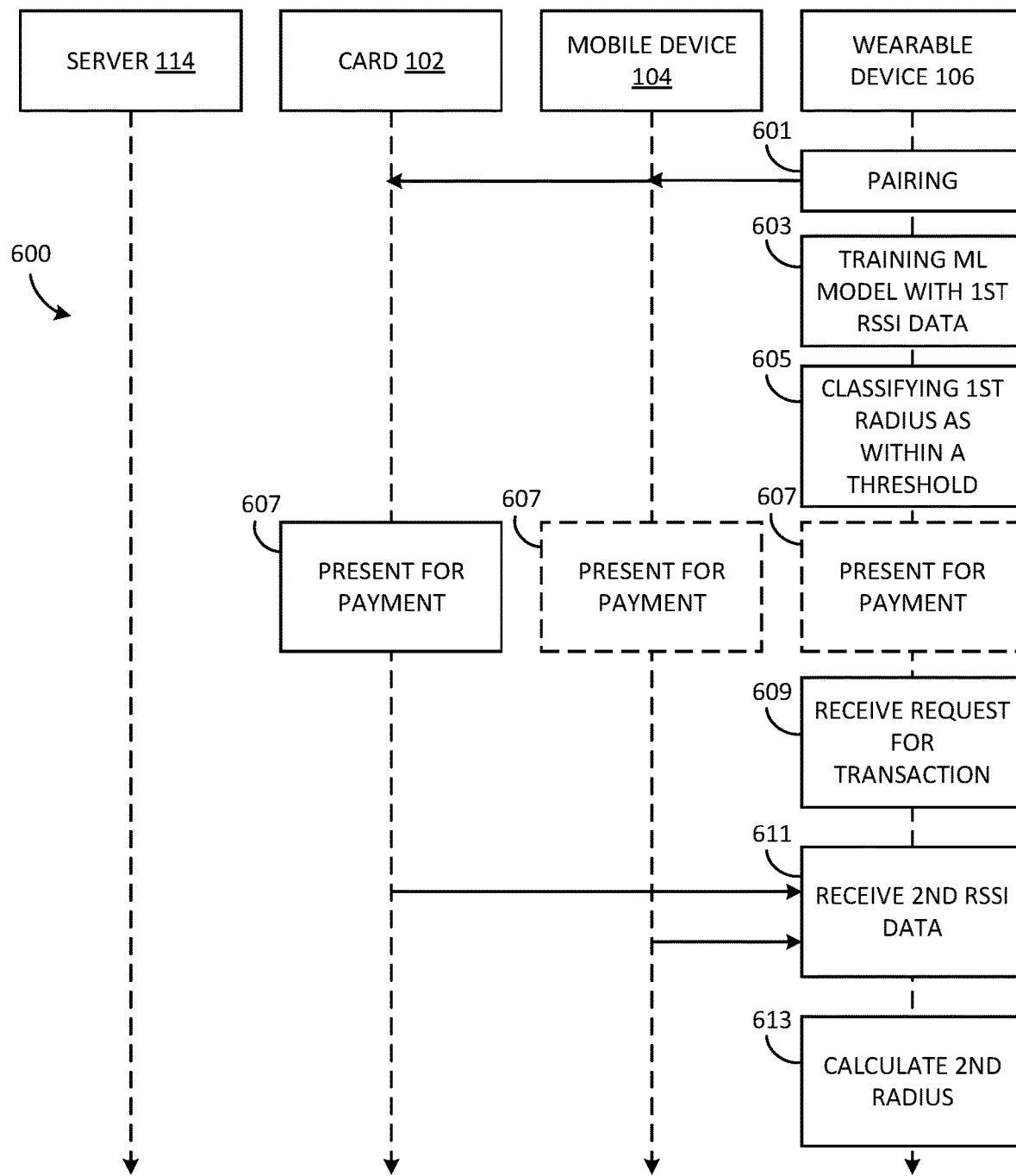
FIGS. 6A-6B are additional example computerized methods of authorizing a transaction.
Figure 6B:
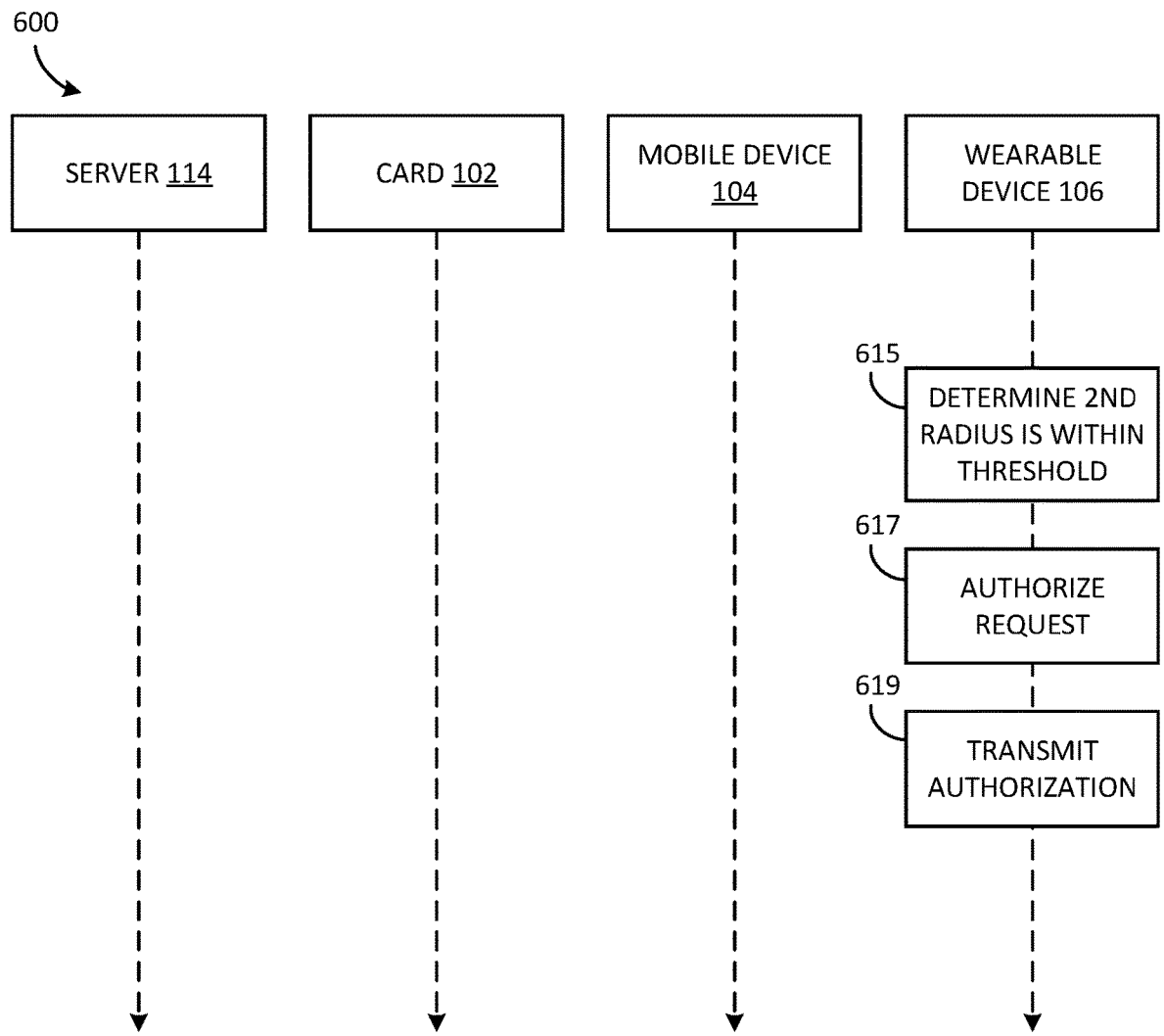

FIGS. 6A-6B are an example computerized method of authorizing a transaction. These flowcharts illustrate various options, not all of which are required for any one implementation. The method 600 illustrated in FIGS. 6A and 6B is for illustration only. FIG. 6B extends FIG. 6A and is a continuation of the method 600 which begins in FIG. 6A. Other examples of the method 600 can be used without departing from the scope of the present disclosure. The method 600 can be implemented by one or more components of the system 100 illustrated in FIG. 1 or the system 200 illustrated in FIG. 2, such as the components of the example computing device 800 described in greater detail below in the description of FIG. 8. For example, FIGS. 6A and 6B illustrate the method 600 as performed by the card 102, the mobile electronic device 104, the wearable device 106, and the server 114 of the system 100, but various examples are contemplated. In the example illustrated in FIGS. 6A and 6B, the wearable device 106 is the computing device 202.

The method 600 begins by the wearable device 106 pairing the card 102, the mobile electronic device 104, and the wearable device 106 in operation 601. Accordingly, each of the card 102, the mobile electronic device 104, and the wearable device 106 recognize one another based on specific, exchanged NFC or RFID signals. In some implementations, the paired devices are stored in a profile of a particular user that associates each of the card 102, the mobile electronic device 104, and the wearable device 106 with the user. The user profile can be stored on one or more of the server 114, the mobile electronic device 104, and the wearable device 106.

In operation 603, the wearable device 106 trains the ML model 224 with first RSSI data. The first RSSI data can be RSSI data received at calibrated distances to establish the strength and directionality of RSSI data, such as NFC or RFID data, received from the different devices. When the first RSSI data is received, a first proximity radius 108 is calculated that encompasses the card 102, the mobile electronic device 104, and the wearable device 106. The calculated proximity radius 108 is determined to be either within a threshold or not within the threshold. For example, in operation 605, the calculated first proximity radius 108 is classified as within a threshold. In some implementations, RSSI data is received at multiple calibrated distances to establish the threshold and determine, for the particular user, whether the card 102, the mobile electronic device 104, and the wearable device 106 are near enough to one another that a transaction should be authorized.

In operation 607, the card 102 is presented for payment as part of a transaction. For example, the card 102 is presented to the POS terminal 110 by swiping the card 102, inserting the card 102 into the POS terminal 110, or bringing the card 102 into a near enough proximity to the POS terminal 110 to initiate a contactless payment. It should be understood that the payment can be initiated in operation 605 by mechanisms other than the card 102. In some implementations, either the mobile electronic device 104 or the wearable device 106 is presented at the POS terminal 110 for payment as part of the transaction.

In operation 609, the wearable device 106 receives a request for the transaction initiated by one of the card 102, the mobile electronic device 104, and the wearable device 106. The wearable device 106 receives the request for the transaction from the POS terminal 110, or the chip reader of the POS terminal 110, where one of the card 102, the mobile electronic device 104, and the wearable device 106 was presented in operation 507.

In operation 611, the wearable device 106 obtains second RSSI data from payment cards and devices surrounding the device or payment card which was presented for payment in operation 607. For example, where the card 102 was presented for the transaction, the wearable device 106 obtains RSSI data from the card 102 and any electronic devices in the proximity of the card 102. As another example, where the mobile electronic device 104 was presented for payment, the server 114 obtains data from the mobile electronic device 104, the card 102, and the wearable device 106.

In some implementations, the wearable device 106 obtains RSSI data from devices that are not associated with the card 102, the mobile electronic device 104, and the wearable device 106. For example, additional devices can be located proximate to the POS terminal 110 and the card 102, such as a device belonging to or used by a sales associate or other customers in an area where the POS terminal 110 is located. In these implementations, the wearable device 106 identifies the mobile electronic device 104 and the wearable device 106 as approved devices associated with the card 102 for the transaction. Accordingly, the wearable device 106 identifies the obtained RSSI data from non-associated devices and ignores this data. In other words, the RSSI data obtained from non-associated devices is not used in the additional operations of method 600.

In operation 613, the wearable device 106 calculates a second proximity radius 108 that encompasses the card 102, the mobile electronic device 104, and the wearable device 106. In implementations where additional RSSI data is obtained from extraneous devices or cards, the additional RSSI data is ignored and not used for the calculation of the second proximity radius 108. As described herein, the wearable device 106 can calculate the second proximity radius 108 using a Euclidean distance formula, a Kernel Density Estimation, or any other suitable means. In some implementations, a value corresponding to the calculated second proximity radius 108 is saved and stored on the wearable device 106 to be used to further train the ML model 224.

In operation 615, the wearable device 106 determines the second proximity radius 108 is within the threshold determined by the ML model 224. The wearable device 106 compares the second proximity radius 108 to the threshold and, based on determining the second proximity radius 108 is less than or equal to the threshold, authorizes the transaction in operation 617 and transmits authorization of the transaction to the POS terminal 110 in order for the transaction to be executed at the POS terminal 110.

In some implementations, the wearable device 106 compares the second proximity radius 108 to the threshold and determines the second proximity radius 108 is greater than the threshold. Then, the wearable device 106 denies the transaction and transmits a signal denying the transaction to the POS terminal 110. Based on the signal denying the transaction, the transaction is not executed.

Figure 7A:
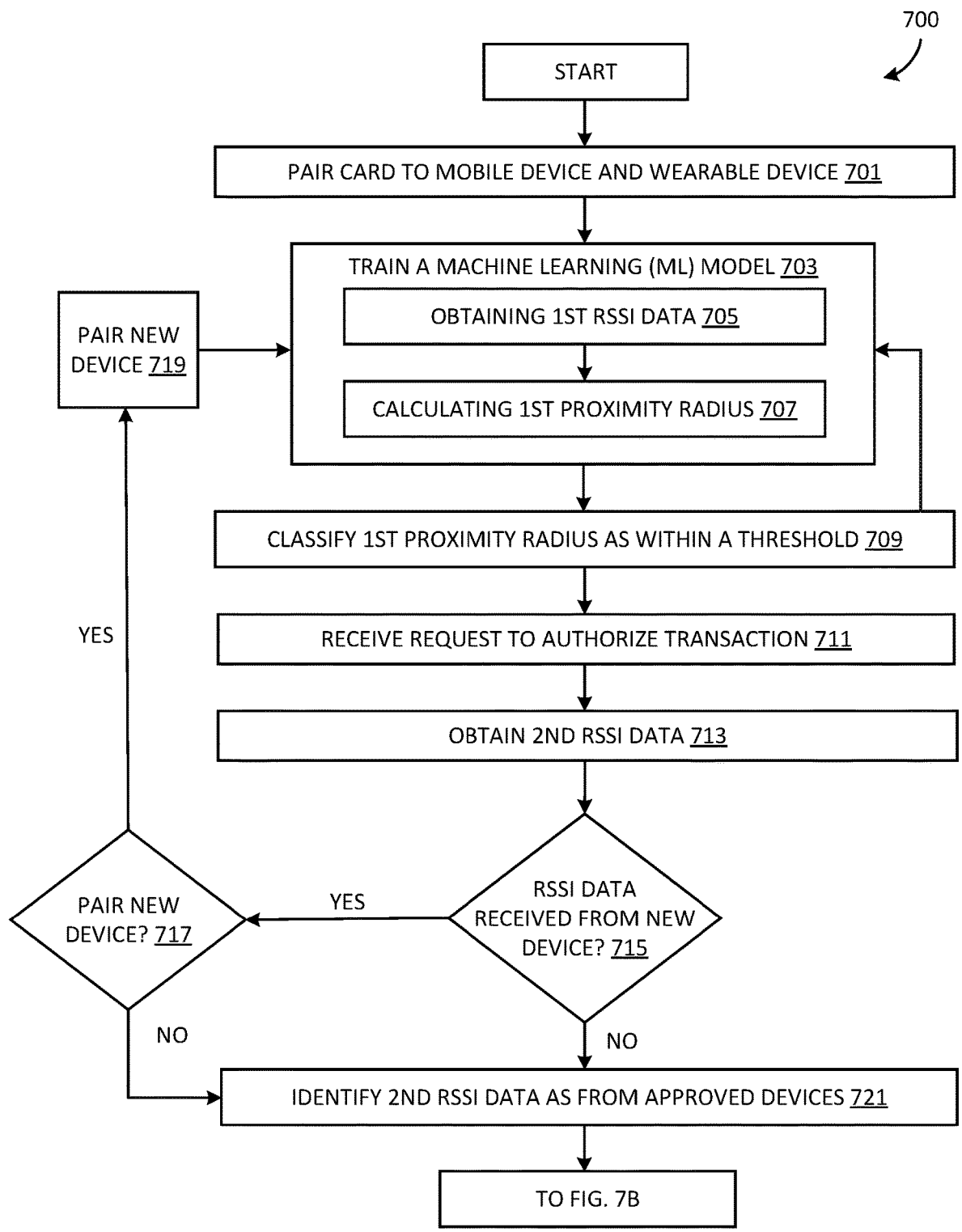
FIGS. 7A-7B are additional example computerized methods of authorizing a transaction.
Figure 7B:
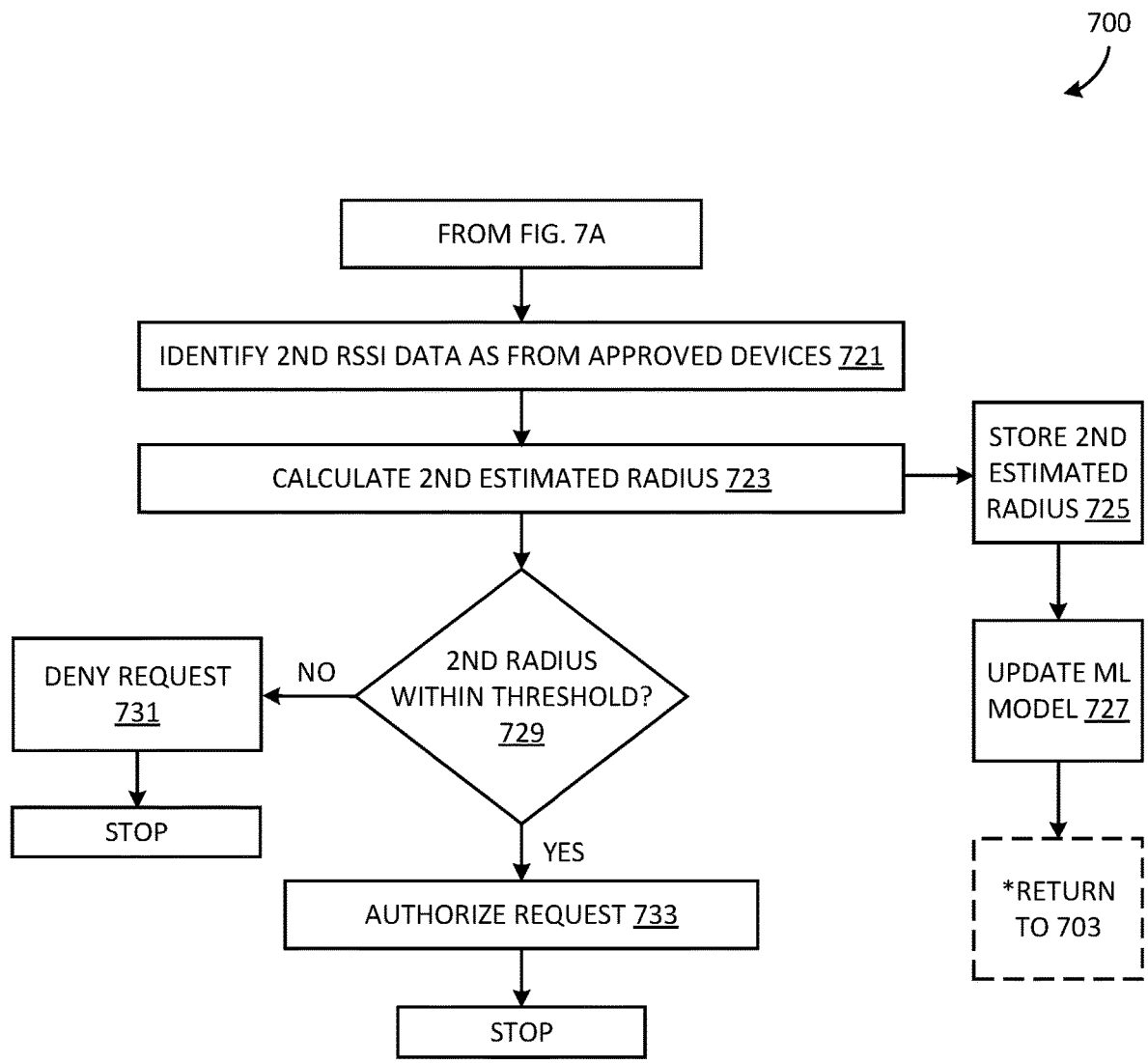

FIGS. 7A-7B are an example computerized method of authorizing a request. These flowcharts illustrate various options, not all of which are required for any one implementation. The method 700 illustrated in FIGS. 7A and 7B is for illustration only. FIG. 7B extends FIG. 7A and is a continuation of the method 700 which begins in FIG. 7A. Other examples of the method 700 can be used without departing from the scope of the present disclosure. The method 700 can be implemented by one or more components of the system 100 illustrated in FIG. 1 or the system 200 illustrated in FIG. 2, such as the components of the example computing device 800 described in greater detail below in the description of FIG. 8. For example, FIGS. 7A and 7B illustrate the method 700 as implemented by the server 114, but various examples are contemplated. The method 700 can be implemented by the mobile electronic device 104 or the wearable device 106, or any combination of the mobile electronic device 104, the wearable device 106, and the server 114, without departing from the scope of the present disclosure.

The method 700 begins by the server 114 pairing the card 102 to the mobile electronic device 104 and the wearable device 106 in operation 701. In some implementations, the card 102 is a payment card. The server 114 pairs the card 102, the mobile electronic device 104, and the wearable device 106 such that each device recognizes the others based on the NFC or RFID signals. In some implementations, the server 114 stores the pairing information in a profile associated with a user of the card 102, the mobile electronic device 104, and the wearable device 106. The profile can be generated and stored for the user.

In operation 703, the server 114 trains a ML model, such as the ML model 224. As described herein, training the ML model 224 includes obtaining first RSSI data in operation 705 and calculating a first proximity radius 108 in operation 707. The first RSSI data is obtained at calibrated intervals from the paired card 102, mobile electronic device 104, and wearable device 106 and the first proximity radius 108 is calculated that encompasses the card 102, the mobile electronic device 104, and the wearable device 106. The first proximity radius 108 can be calculated by using a Euclidean distance formula, a Kernel Density Estimation, or any other suitable means as described herein.

In operation 709, the server 114 classifies the first proximity radius 108 as being within a threshold. The classification of the first proximity radius 108 as being within the threshold is returned to the ML model 224. Accordingly, the ML model 224 utilizes the value of the first proximity radius 108 and the classification of the value as within the threshold to continuously update and retrain in order to further optimize the threshold.

In operation 711, the server 114 receives a request to authorize a request. The request can be received from a POS terminal 110, such as the chip reader of the POS terminal 110. The request can be generated by one of the card 102, the mobile electronic device 104, and the wearable device 106 being presented to the POS terminal 110 to initiate a request. In some implementations, the request is a transaction request.

In operation 713, the server 114 obtains second RSSI data from the devices and/or cards in proximity to the device or card that initiated the request. For example, where the card 102 was presented at the POS terminal 110, the server 114 obtains RSSI data from the card 102 and any other devices within the NFC or RFID proximity to the card 102. In operation 715, the server 114 determines whether RSSI data was received from a new device, such as the additional device 116. In some implementations, a new device is any device for which RSSI data has not been previously received. In other implementations, a new device is any device that has not been paired and is not part of the generated profile. If RSSI data from a new device is received, the method 700 proceeds to operation 717. If RSSI data from a new device is not received, the second RSSI data is identified as from approved devices only in operation 721.

In operation 717, the server 114 determines whether to pair the new device for which RSSI data is obtained. For example, the server 114 can send a prompt to one or more of the devices included in the generated profile requesting whether the user of the device would like to pair the newly detected device. The user can then select 'Yes' to pair the device or 'No' to not pair the device. In other implementations, the server 114 determines to automatically pair or not pair the device based on a number of times the device has been detected in the proximity radius 108 for a request. For example, the server 114 can automatically not pair the device until the device has been detected a threshold number of times and, when the threshold is reached, either automatically pair the device or send the prompt to one or more of the devices of the user. In implementations where the server 114 determines to pair the new device, the server 114 pairs the new device in operation 719, where the ML model is continuously updated and trained using the new device in addition to previously paired devices. In implementations where the server 114 determines not to pair the new device, the server 114 elects not to pair the new device and proceeds to operation 721.

In operation 721, the server 114 identifies the received second RSSI data as being from approved devices. As described herein, approved devices can include the devices paired to the card 102 in either of operations 701 or 719. Approved devices can further include devices that have been authenticated and stored in the generated profile for the user, for example as an aspect of the user data 216. The identification can be based on SSID information received from the devices.

In operation 723, the server 114 calculates the second estimated proximity radius 108. The estimated second proximity radius 108 can be calculated in the same manner as the first proximity radius 108 as described in operation 707. For example, the second proximity radius 108 can be calculated by using a Euclidean distance formula, a Kernel Density Estimation, or any other suitable means as described herein. In operation 725, the server 114 stores the estimated second proximity radius 108 to be used to further update and train the ML model 224 in operation 727. In some implementations, the storing the estimated second proximity radius 108 in operations 725, updating the ML model 224 in operation 727, and returning to operation 703 to further train and update the ML model 224 creates a feedback loop that improves the server 114, e.g., the computing device 202, by further optimizing the transaction authorization manager 222 to more effectively determine the threshold for authorizing a request and therefore authorizing, with greater accuracy, requests intended by a user of the card 102, mobile electronic device 104, or wearable device 106 and denying, with greater accuracy, requests not intended to be authorized by the user of the card 102, mobile electronic device 104, or wearable device 106.

In operation 729, the server 114 determines whether the estimated second proximity radius 108 is within the threshold using the ML model 224. In some implementations, determining whether the estimated second proximity radius 108 is within the threshold includes identifying the threshold at the particular point in time that the request for the request was received. For example, as described herein, the ML model 224 is continuously improving and updating the threshold to optimize for the user preferences, devices being added to or removed from the generated profile, and so forth. The optimal threshold for particular devices at the point in time the request is received is identified and the server 114 determines whether the estimated second proximity radius 108 is within the threshold or outside of the threshold.

In operation 731, the server 114 determines the estimated second proximity radius 108 is not within the threshold for authorizing a request and denies the request. In operation 733, the server 114 determines the estimated second proximity radius 108 is within the threshold for authorizing a request and authorizes the request. In each case, the server 114 returns the results of the determination in operation 729 to the ML model 224 for further updating and training.

In some implementations, the ML model 224 determines to authorize or deny the request based on additional information in combination with whether the estimated second proximity radius 108 is within the threshold. In some implementations, the generated profile for the user can include a classification of a primary device that must be identified as one of the detected devices. For example, where the mobile electronic device 104 is classified as the primary device, the request can be authorized based on the received RSSI data from the mobile electronic device 104 or denied based on missing RSSI data from the mobile electronic device 104. As another example, where the wearable device 106 is classified as the primary device, the request can be authorized based on the received RSSI data from the wearable device 106 or denied based on missing RSSI data from the wearable device 106.

In some implementations, the server 114 determines whether the estimated second proximity radius 108 is smaller, shorter, or otherwise less than, the threshold, indicating the approved devices are close enough together to authorize the request, or longer, or greater than, the request, indicating the approved devices are not close enough together to authorize the request. In other words, the estimated second proximity radius 108 being shorter than proximity radiuses of previously authorized requests indicates the request may be authorized and the estimated second proximity radius 108 being longer than proximity radiuses of previously authorized requests indicates the request may be authorized.

It should be understood that although the steps of the method 700 are described herein as being performed by the server 114, this example is provided for illustration only and should not be construed as limiting. Various implementations of the method 700 include the steps being executed by the mobile electronic device 104 or the wearable device 106. In some implementations, the steps of the method 700 are implemented by the same device presented for payment at the POS terminal 110. For example, the mobile electronic device 104 can be presented to the POS terminal 110 by a user to initiate a contactless payment and then execute the steps of the method 700. Likewise, the wearable device 106 can be presented to the POS terminal 110 by a user to initiate a contactless payment and then execute the steps of method 700.

Example Operating Environment

Figure 8:
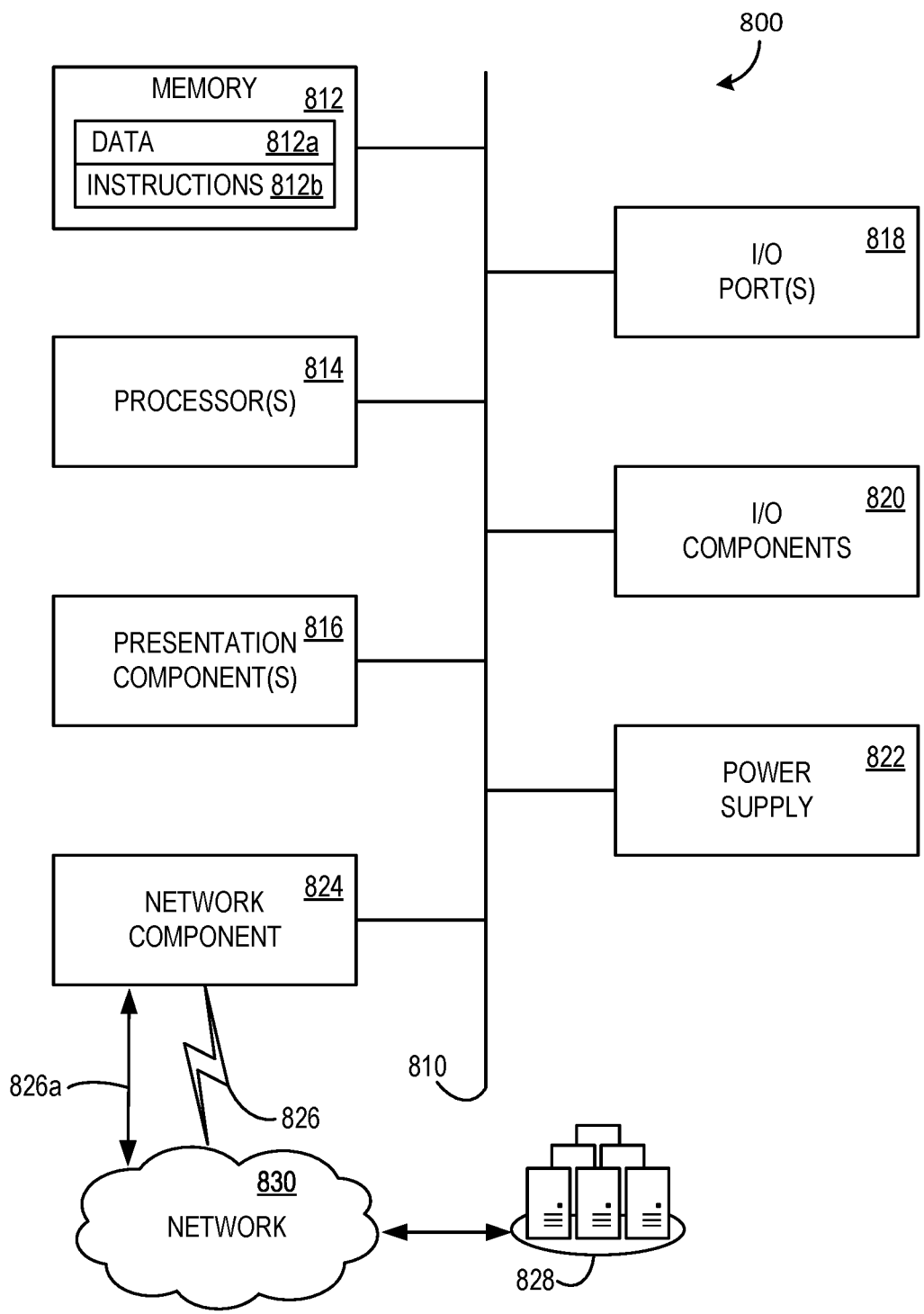
FIG. 8 is a block diagram of an example computing device for implementing implementations of the present disclosure.

FIG. 8 is a block diagram of an example computing device 800 for implementing aspects disclosed herein and is designated generally as computing device 800. Computing device 800 is an example of a suitable computing environment and is not intended to suggest any limitation as to the scope of use or functionality of the examples disclosed herein. Neither should computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

In some examples, the computing device 800 is the computing device 202. Accordingly, the memory 812, the processor 814, the presentation component(s) 816, and the network 830 can be the memory 204, the processor 208, the user interface 210, and the network 234, respectively. However, these examples should not be construed as limiting. Various examples are possible.

Computing device 800 includes a bus 810 that directly or indirectly couples the following devices: computer-storage memory 812, one or more processors 814, one or more presentation components 816, I/O ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more busses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer storage media references below and operatively provide storage of computer-readable instructions, data structures, program modules and other data for computing device 800. In some examples, memory 812 stores one or more of an operating system, a universal application platform, or other program modules and program data. Memory 812 is thus able to store and access data 812a and instructions 812b that are executable by processor 814 and configured to carry out the various operations disclosed herein.

In some examples, memory 812 includes computer storage media in the form of volatile and/or nonvolatile memory, removable or non-removable memory, data disks in virtual environments, or a combination thereof. Memory 812 may include any quantity of memory associated with or accessible by computing device 800. Memory 812 may be internal to computing device 800, external to computing device 800, or both. Examples of memory 812 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 800. Additionally, or alternatively, memory 812 may be distributed across multiple computing devices 800, for example, in a virtualized environment in which instruction processing is carried out on multiple computing devices 800. For the purposes of this disclosure, "computer storage media," "computer-storage memory," "memory," and "memory devices" are synonymous terms for computer-storage memory 812, and none of these terms include carrier waves or propagating signaling.

Processor(s) 814 may include any quantity of processing units that read data from various entities, such as memory 812 or I/O components 820 and may include CPUs and/or GPUs. Specifically, processor(s) 814 are programmed to execute computer-executable instructions for implementing aspects of the disclosure. The instructions may be performed by the processor, by multiple processors within computing device 800, or by a processor external to client computing device 800. In some examples, processor(s) 814 are programmed to execute instructions such as those illustrated in the in the accompanying drawings. Moreover, in some examples, processor(s) 814 represent an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

Computing device 800 may operate in a networked environment via network component 824 using logical connections to one or more remote computers. In some examples, network component 824 includes a network interface card and/or computer-executable instructions (e.g., a driver) for operating the network interface card. Communication between computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 824 communicates over wireless communication link 826 and/or a wired communication link 826a to a cloud resource 828 across network 830. Various different examples of communication links 826 and 826a include a wireless connection, a wired connection, and/or a dedicated link, and in some examples, at least a portion is routed through the internet.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are non-transitory and not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively, or in addition to the other examples described herein, examples include any combination of the following:
  pairing a card to a mobile electronic device and a wearable device, the card including at least one of NFC or RFID capability;
  training a machine learning model by obtaining first received signal strength indicator (RSSI) data from the card, the mobile electronic device, and the wearable device at calibrated distances, calculating a first estimated proximity radius encompassing the card, the mobile electronic device, and the wearable device, based on the first RSSI data,
  classifying the first estimated proximity radius to be within a threshold;
  receiving, from a chip reader, a request to authorize a request;
  obtaining second RSSI data from the card, the mobile electronic device, and the wearable device;
  calculating a second estimated proximity radius encompassing the card, the mobile electronic device, and the wearable device based on the second RSSI data;
  using the trained machine learning model, determining that the second estimated proximity radius is within the threshold;
  authorizing, to the chip reader, the request;
  storing the calculated second estimated proximity radius;
  updating the machine learning model to update the threshold based on the stored second estimated proximity radius;
  identifying the mobile electronic device and the wearable device as approved devices for the request;
  based on the identification, calculating the second estimated proximity radius;
  generating and storing a profile for a user associated with the card, the mobile electronic device, and the wearable device;
  classifying the mobile electronic device as a primary device associated with the card;
  receiving the second RSSI data from only the mobile electronic device;
  identifying missing RSSI data from the wearable device based on the generated profile;
  authorizing the request based on the second RSSI data being received from the mobile electronic device;
  receiving the second RSSI data from only the wearable device,
  identifying missing RSSI data from the mobile electronic device based on the generated profile;
  denying the request based on the missing RSSI data from the mobile electronic device;
  classify the wearable device as a primary device associated with the card;
  receive the second RSSI data from only the wearable device, identify missing RSSI data from the mobile electronic device based on the generated profile;
authorize the request based on the second RSSI data being received from the wearable device;
the card is a payment card;
the request is a payment request;
comparing the second estimated proximity radius to previous proximity radiuses calculated corresponding to the card;
determining the second estimated proximity radius is smaller than the previous proximity radiuses of previously authorized requests;
receiving additional RSSI data from an additional electronic device while obtaining the second RSSI data from the card, the mobile electronic device, and the wearable device; and
pairing the additional electronic device to the card.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A method of authentication, the method comprising:
pairing a card to a mobile electronic device and a wearable device, the card including at least one of near-field communication (NFC) or radio frequency identification (RFID) capability;
training a machine learning model by obtaining first received signal strength indicator (RSSI) data from the card, the mobile electronic device, and the wearable device at calibrated distances, calculating a first estimated proximity radius encompassing the card, the mobile electronic device, and the wearable device, based on the first RSSI data,
classifying the first estimated proximity radius to be within a threshold;
receiving, from a chip reader, a request to authorize a request;
obtaining second RSSI data from the card, the mobile electronic device, and the wearable device;
calculating a second estimated proximity radius encompassing the card, the mobile electronic device, and the wearable device based on the second RSSI data;
using the trained machine learning model, determining that the second estimated proximity radius is within the threshold; and
authorizing, to the chip reader, the request.

2. The method of claim 1, further comprising:
storing the calculated second estimated proximity radius; and
updating the machine learning model to update the threshold based on the stored second estimated proximity radius.

3. The method of claim 1, further comprising:
identifying the mobile electronic device and the wearable device as approved devices for the request; and
based on the identification, calculating the second estimated proximity radius.

4. The method of claim 1, further comprising:
generating and storing a profile for a user associated with the card, the mobile electronic device, and the wearable device; and
classifying the mobile electronic device as a primary device associated with the card.

5. The method of claim 4, further comprising:
receiving the second RSSI data from only the mobile electronic device;
identifying missing RSSI data from the wearable device based on the generated profile; and
authorizing the request based on the second RSSI data being received from the mobile electronic device.

6. The method of claim 1, wherein:
the card is a payment card, and
the request is a payment request.

7. The method of claim 1, wherein determining that the second estimated proximity radius is within the threshold further comprises:
comparing the second estimated proximity radius to previous proximity radiuses calculated corresponding to the card; and
determining the second estimated proximity radius is smaller than the previous proximity radiuses of previously authorized requests.

8. The method of claim 1, further comprising:
receiving additional RSSI data from an additional electronic device while obtaining the second RSSI data from the card, the mobile electronic device, and the wearable device; and
pairing the additional electronic device to the card.

9. A system of authentication, the system comprising:
a processor;
a communications interface; and
a memory storing instructions that, when executed by the processor, cause the processor to:

pair a card to a mobile electronic device and a wearable device, the card including at least one of near-field communication (NFC) or radio frequency identification (RFID) capability;

train a machine learning model by obtaining first received signal strength indicator (RSSI) data from the card, the mobile electronic device, and the wearable device at calibrated distances, calculating a first estimated proximity radius encompassing the card, the mobile electronic device, and the wearable device, based on the first RSSI data;

classifying the first estimated proximity radius to be within a threshold;

receive, from a chip reader, a request to authorize a request;

obtain second RSSI data from the card, the mobile electronic device, and the wearable device;

calculate a second estimated proximity radius encompassing the card, the mobile electronic device, and the wearable device based on the second RSSI data;

using the trained machine learning model, determine that the second estimated proximity radius is within the threshold; and authorize, to the chip reader, the request.

10. The system of claim 9, wherein the instructions further cause the processor to:
store the calculated second estimated proximity radius; and
update the machine learning model to update the threshold based on the stored second estimated proximity radius.

11. The system of claim 9, wherein the instructions further cause the processor to:
identify the mobile electronic device and the wearable device as approved devices for the request; and
based on the identification, calculate the second estimated proximity radius.

12. The system of claim 9, wherein the instructions further cause the processor to:
generate and store a profile for a user associated with the card, the mobile electronic device, and the wearable device; and
classify the wearable device as a primary device associated with the card.

13. The system of claim 12, wherein the instructions further cause the processor to:
receive the second RSSI data from only the wearable device;
identify missing RSSI data from the mobile electronic device based on the generated profile; and
authorize the request based on the second RSSI data being received from the wearable device.

14. The system of claim 9, wherein:
the card is a payment card, and
the request is a payment request.

15. The system of claim 9, wherein, to determine that the second estimated proximity radius is within the threshold, the instructions further cause the processor to:
compare the second estimated proximity radius to previous proximity radiuses calculated corresponding to the card; and
determine the second estimated proximity radius is smaller than the previous proximity radiuses of previously authorized requests.

16. The system of claim 9, wherein the instructions further cause the processor to:
receive additional RSSI data from an additional electronic device while obtaining the second RSSI data from the card, the mobile electronic device, and the wearable device; and
pair the additional electronic device to the card.

17. A non-transitory computer-readable medium storing instructions for authentication that, when executed by a processor, cause the processor to:
pair a card to a mobile electronic device and a wearable device, the card including at least one of near-field communication (NFC) or radio frequency identification (RFID) capability;
train a machine learning model by obtaining first received signal strength indicator (RSSI) data from the card, the mobile electronic device, and the wearable device at calibrated distances, calculating a first estimated proximity radius encompassing the card, the mobile electronic device, and the wearable device, based on the first RSSI data;
classifying the first estimated proximity radius to be within a threshold;
receive, from a chip reader, a request to authorize a request;
obtain second RSSI data from the card, the mobile electronic device, and the wearable device;
calculate a second estimated proximity radius encompassing the card, the mobile electronic device, and the wearable device based on the second RSSI data;
using the trained machine learning model, determine that the second estimated proximity radius is within the threshold; and
authorize, to the chip reader, the request.

18. The non-transitory computer-readable medium of claim 17, further storing instructions that, when executed by the processor, further cause the processor to:
store the calculated second estimated proximity radius; and
update the machine learning model to update the threshold based on the stored second estimated proximity radius.

19. The non-transitory computer-readable medium of claim 17, further storing instructions that, when executed by the processor, further cause the processor to:
identify the mobile electronic device and the wearable device as approved devices for the request; and
based on the identification, calculate the second estimated proximity radius.

20. The non-transitory computer-readable medium of claim 17, further storing instructions that, to determine that the second estimated proximity radius is within the threshold, when executed by the processor, further cause the processor to:
compare the second estimated proximity radius to previous proximity radiuses calculated corresponding to the card; and
determine the second estimated proximity radius is smaller than the previous proximity radiuses of previously authorized requests.

* * * * *